Jan. 11, 1938.  H. B. INGLIS  2,105,147
BOMB SIGHT AND PILOT DIRECTOR
Original Filed Feb. 8, 1930   11 Sheets-Sheet 1

INVENTOR
Henry B. Inglis

Jan. 11, 1938.  H. B. INGLIS  2,105,147

BOMB SIGHT AND PILOT DIRECTOR

Original Filed Feb. 8, 1930  11 Sheets-Sheet 2

INVENTOR
Henry B. Inglis

Jan. 11, 1938. H. B. INGLIS 2,105,147

BOMB SIGHT AND PILOT DIRECTOR

Original Filed Feb. 8, 1930 11 Sheets-Sheet 3

INVENTOR
Henry B. Inglis

Jan. 11, 1938. H. B. INGLIS 2,105,147
BOMB SIGHT AND PILOT DIRECTOR
Original Filed Feb. 8, 1930 11 Sheets-Sheet 4
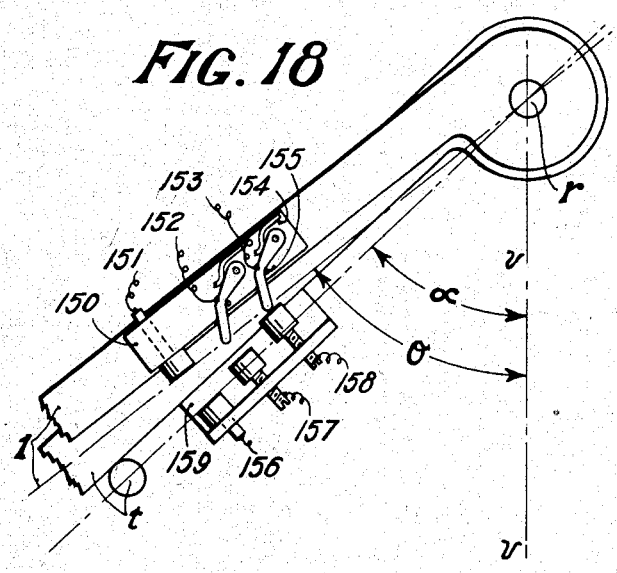
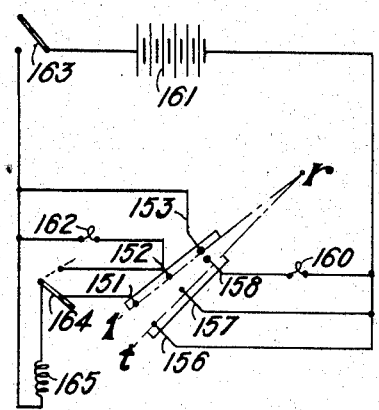
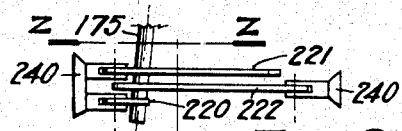
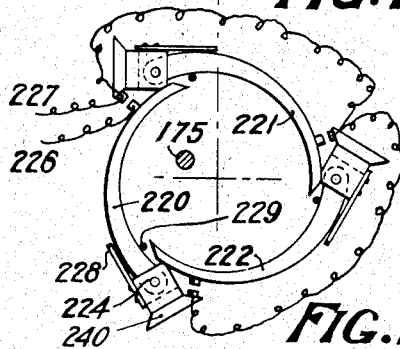
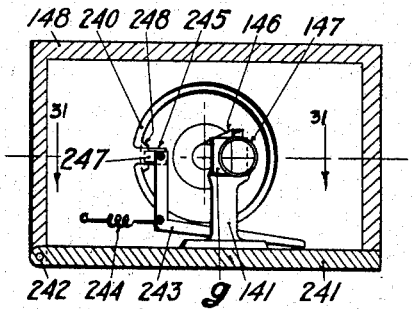
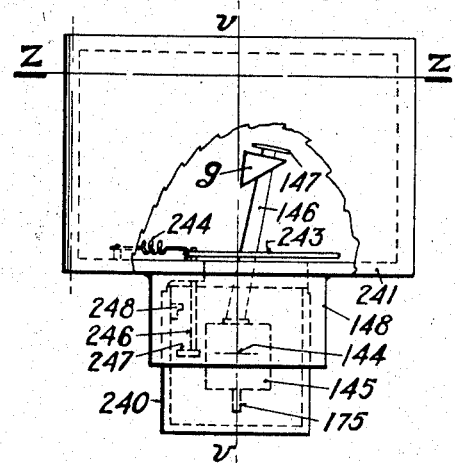
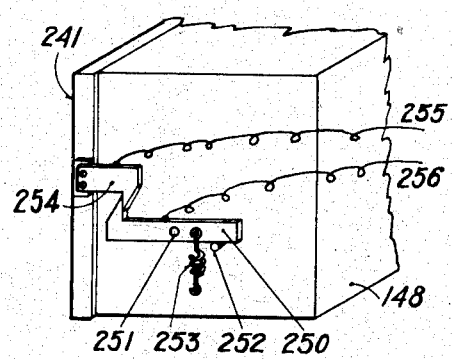
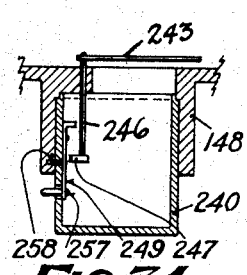
INVENTOR
Henry B. Inglis

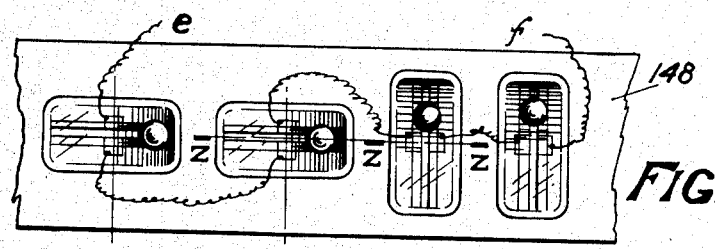
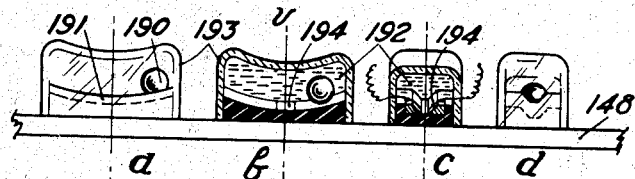
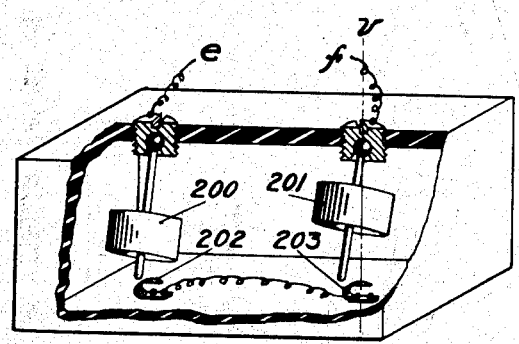
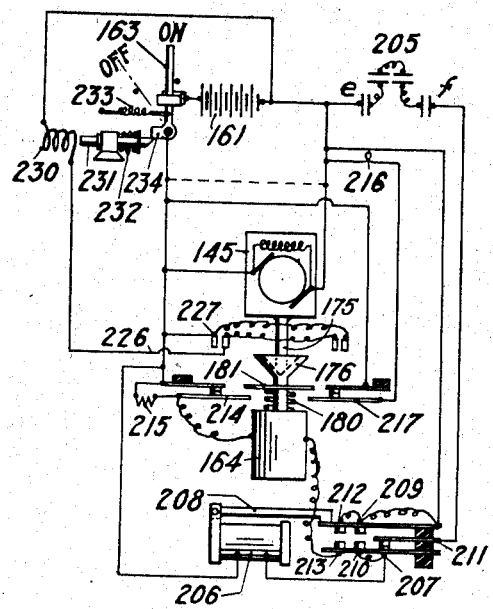
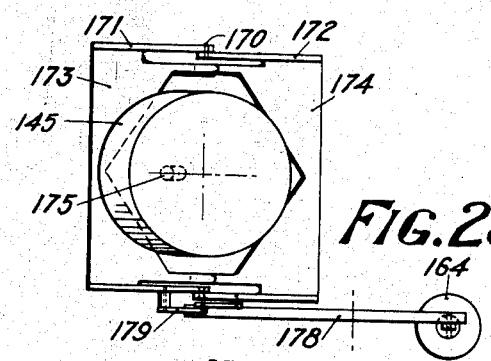
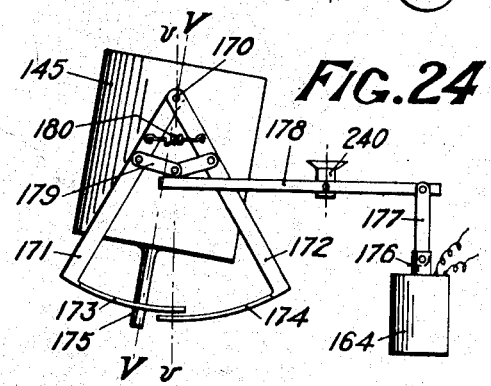

Jan. 11, 1938.　　　　H. B. INGLIS　　　　2,105,147
BOMB SIGHT AND PILOT DIRECTOR
Original Filed Feb. 8, 1930　　11 Sheets-Sheet 6

INVENTOR
Henry B. Inglis

Jan. 11, 1938.   H. B. INGLIS   2,105,147
BOMB SIGHT AND PILOT DIRECTOR
Original Filed Feb. 8, 1930   11 Sheets-Sheet 7

INVENTOR.
Henry B. Inglis

Jan. 11, 1938. H. B. INGLIS 2,105,147

BOMB SIGHT AND PILOT DIRECTOR

Original Filed Feb. 8, 1930    11 Sheets-Sheet 8

INVENTOR
Henry B. Inglis

Jan. 11, 1938.  H. B. INGLIS  2,105,147

BOMB SIGHT AND PILOT DIRECTOR

Original Filed Feb. 8, 1930  11 Sheets-Sheet 9

INVENTOR
Henry B. Inglis

Jan. 11, 1938.   H. B. INGLIS   2,105,147
BOMB SIGHT AND PILOT DIRECTOR
Original Filed Feb. 8, 1930   11 Sheets-Sheet 10

INVENTOR
Henry B. Inglis

Jan. 11, 1938.  H. B. INGLIS  2,105,147
BOMB SIGHT AND PILOT DIRECTOR
Original Filed Feb. 8, 1930   11 Sheets-Sheet 11
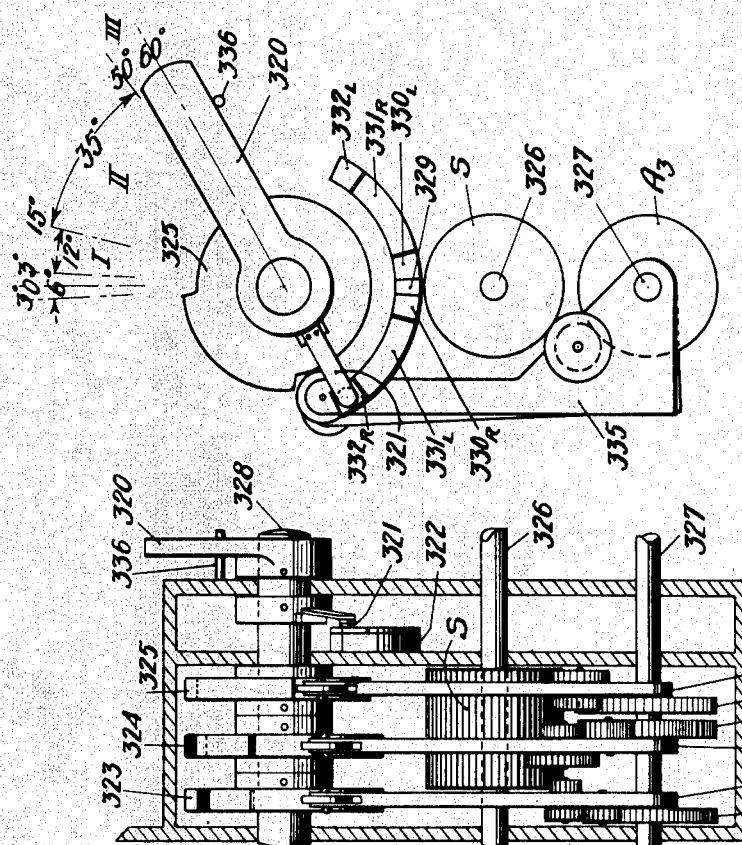
FIG. 48
FIG. 49
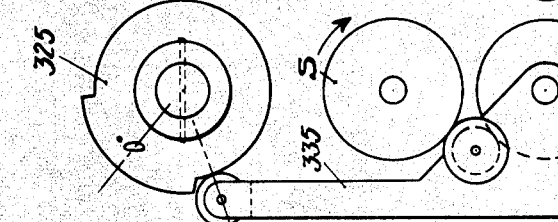
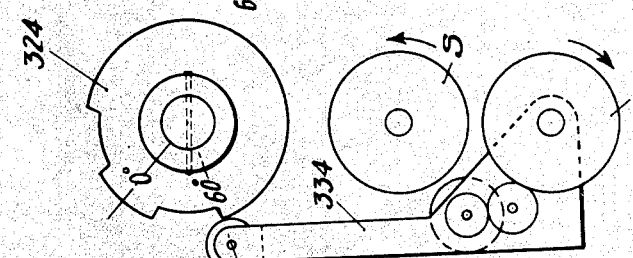
FIG. 50
INVENTOR
Henry B. Inglis Patented Jan. 11, 1938

2,105,147

UNITED STATES PATENT OFFICE 2,105,147

BOMB SIGHT AND PILOT DIRECTOR

Henry B. Inglis, Flint, Mich.

Application February 8, 1930, Serial No. 426,808
Renewed June 15, 1936

32 Claims. (Cl. 33—46.5)

My invention relates to the general class of computing mechanisms, and more specifically, mechanisms in combination with a process of sighting by optical means, for computing data for the aiming of projectiles. The present invention also comprises improved instrumental means for the guidance of the pilot of craft, particularly aircraft. In this class of apparatus are instruments called bomb sights devised to enable the operator or "bomber" to determine, during the flight of a carrier aircraft along the course at a certain altitude above the level of the objective, when to release a bomb, or bombs, corresponding to the arrival of the craft where it is distant from the objective, the horizontal component, or "range", of the bomb trajectory which the bomb, after release at that position, will thereafter follow.

The principal advantage of my invention over devices of this kind heretofore employed lies in the fact that it does not require continuous manual manipulation and attention except when corrections are necessary, in contrast to the conditions heretofore obtained in operating these devices wherein an operator was obliged to actuate the controlling elements continuously. I thus avoid the personal errors which enter into the operation of range finders of the type heretofore employed.

Another object of my invention is to provide a mechanism that is greatly simplified over that heretofore employed. One of the means which I employ to obtain this result is such a construction wherein a single factor is mechanically introduced into several different settings simultaneously and by a single operation. Thus, for example, a single setting of altitude is entered into the mechanism for synchronous training of line of sight for establishing range as a function of altitude and in the trail correction to obtain summital speed. Another method by which I obtain this result is by providing a mechanism wherein only four factors need be set, namely, synchronizing the line of sight into visual coincidence with the objective, altitude, air speed, and type of bomb, and wherein the last three of these factors may be pre-set with precision and the first be pre-set approximately, and any of them may be re-set any time up to the instant for bomb release.

A further object of my invention is to obtain a quicker and more accurate setting of range by utilizing the principle that the range angle is a function of the usual altitude factor and of the novel factor of summital speed, which I define as true range divided by the time of fall in vacuum or, ground speed (or speed of approach) minus a ballistic correction.

It is a further object of my invention to provide a novel azimuth directing system whereby the course of the craft and the vertical plane of the reticule may be quickly and effectively brought into coincidence in the plane of the target. For this purpose I provide means for changing the course of the craft and for changing the position of the vertical plane of the reticule with respect to the craft at selective rates and in selective directions.

My invention further includes a large number of specific improvements which will be pointed out in the following specification.

Further objects and advantages of my invention will become apparent in the following detailed description thereof.

In the accompanying drawings,

Fig. 18 shows in side elevation, detail means of indicating the craft's relation in range to the instant for bomb release, and of actuating automatic bomb release and for hand release lead.

Fig. 19 is an electrical diagram of the operation of Fig. 18.

Figs. 20, 21, are plan and partially sectionalized side views, respectively, of one form of the level detector device.

Fig. 22 is a perspective view of another form of the level detector device.

Figs. 23, 24, are plan and side elevations of one form of gyroscope caging and uncaging mechanism.

Fig. 25 is an electrical diagram showing the operation of the level detector device, and features of improvement in the application of gyroscope caging and uncaging.

Figs. 26, 27, are side and plan views of a limit device, detail of Fig. 25.

Figs. 28, 29, are a sectionalized plan view and side elevation showing protective features in the application of a gyroscope.

Fig. 30 shows in perspective, a further feature of protection of gyroscopes and reticule, relative to assembly in the instrument.

Fig. 31 is a fractional sectional view taken on the line 31—31 of Fig. 28, showing a further protective device.

Fig. 48 is a face view of the directional control, omitting the frame.

Fig. 49 is a left side view of the assembled control showing a frame in section.

Fig. 50 shows separate face view of the three ratio change gear and cam combinations of Fig. 49.

Figure 2:
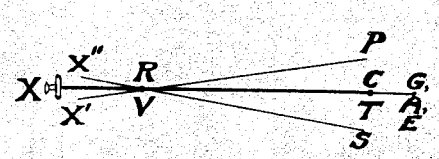
Fig. 2 illustrates in plan view of Fig. 1, relations between the craft's direction of horizontal flight and the bombing approach.

Referring to the drawings, my bombsight is devised to enable the operator, or "bomber", to determine, during the flight of a carrier aircraft along a course, as XRC (Fig. 1), and at an "altitude", as $V^1X$, above the level of an objective, T, when to release a bomb, or bombs, corresponding to the arrival of the craft, as at R, where it is distant from the objective, the horizontal component "range", TV, of the bomb trajectory RBT, which the bomb after release at that position, will thereafter follow.

This trajectory range is accurately calculatable from ballistic data according to the specific combination existing at the instant the bomb is released, of four "flight variables"; "altitude" of craft above the level of the objective; speed of craft relative to the objective, called "ground speed" with reference to a stationary objective, or "relative speed of approach" in case of a moving objective; speed of craft relative to the air, called "air speed"; and type of bomb, or its corresponding coefficient of friction commonly expressed in "terminal velocity". The range may vary by hundreds and thousands of feet, between one bombing approach and the next, according to the combination of those flight variables, and it is a composite and not simple function of their values. Thus, while it is the common primary function of all types of bombsights to pre-set a "line of sight", as XY, RT, at the "range angle" (symbol $\alpha$) with reference to vertical, $V^1X$, VR, so as to subtend at the objective's level, the bomb's range, or, to indicate when the craft reaches the position, as R, corresponding to intersection with the objective of a line of sight between instrument and objective at the predetermined angle $\alpha$ with the vertical, there are many diverse principles and mechanical applications for accomplishing this, varying all the way from rough approximations or dependence in part upon personal estimation of speeds or distances, to highly accurate applications of the basic range formula. Also, the accuracy of average bombing results depends to a greater extent upon the instrumental precision, the higher the altitude. It is equally dependent upon the mode of manipulation or process involved, since the chance which the method may allow for introducing personal errors, due to confusion in number of settings and actions, haste, mental calculations or estimations, is a source of largest probable errors.

Thus, while some previous types of bombsights have been devised upon sufficiently accurate bases of applying the basic range formula, none have produced at high altitudes and under ordinary conditions not favorable to care and deliberation in operation, the degree of precision, measured by average results, which it is the object of my invention to insure.

While I claim no great betterment of purely instrumental precision over that of certain types of instruments heretofore known using the ballistic formula in different manner, it will become clear from the description that I have devised a system of mechanisms and manipulation having novel features to obtain the fullest advantage of the high order of instrumental precision of which the principle is capable. This is accomplished largely by greatly reducing the chances for entering personal errors in the process, by rendering the mode of manipulation of the utmost simplicity, and by insuring reliability of operation.

Some features of my inventions may be adapted to other uses, as for aerial photography, anti-aircraft computers, or navigational use. I shall, however describe them as embodied in a complete bombsight for rendering aerial bombing a formidable military weapon of offense.

While bombsights differ widely as to methods employed in applying the basic range formula and in correcting for air resistance effects upon the bomb's trajectory, i. e., as to methods of introducing the values of the four flight variables, the three factors altitude, air speed, and type of bomb are known in flight, whereas ground speed must be determined during the bombing approach and be combined with the other three factors to determine true range angle or instant of bomb release in range. Bombsights may, therefore, be separated into three distinct categories according as they may be based upon one of three general principles for determining ground speed, viz., "drift", "timing", "synchronous", involving essentially different mechanical applications and each category comprising several different and novel means.

"Drift" methods may be said to include all the various means for determination of ground speed as the vector resultant of "wind" and the craft's air speed. Drift methods involve such prescribed manoeuvering of the flight course as is rarely practicable under wartime handicaps against holding prescribed straight line flight for more than a few seconds time, hence they are usually short cut, in practice, by estimation of wind and the entering of a correspondingly inaccurate ground speed value, and are limited to rather low altitudes or to such favorable conditions as do not, on the average, obtain.

"Timing" methods, may be said to include all means for determining ground speed as an average, over some time interval of measurement. They differ, as by timing over a distance, time, or angle, which may be a constant, or varying according to altitude. Timing methods are capable of accuracy on the condition that the speed of approach remains constant during the time of measurement and up to the instant of bomb release, but under average actual conditions, they involve considerable instrumental inaccuracies, require exacting attention, and allow large personal errors of timed actions in the process, all resulting in an excessive proportion of "wild shots" and a large average error.

"Synchronous" methods may be said to include all means for determining ground speed as an instantaneous rate, not involving any specific timing interval of measurement. My invention comprises a synchronous method, differing from other synchronous methods in mechanism, mode of operation, basis of approximation of the basic ballistic range formula, and mode of introducing air resistance corrections.

It is necessary to an understanding of any bombsight, and, of the advantages of my inventions over the present state of the art, to consider briefly the nature of a bomb's trajectory and, the directional vector relations between wind, air speed, and ground speed.

A bomb, like a gun projectile, follows the well-known law of falling bodies. The specific trajectory or "path" RT (Fig. 1) of a bomb, and the range VT, of that path, are accurately determinable by ballistic calculations for any given combination of the four flight variables; altitude, VR, of the craft, R, above the level of the objective, T; air speed and ground speed of the craft at R, along course XR; and type of bomb. For the sake of clarity, consider for the moment Fig. 1 to illustrate the case of no wind, in which case the craft's speed and direction through air and over the ground are the same, i. e., its course RA reference to air is the same as its course RG reference to the ground. The bomb, released from the craft at R, takes on, due to gravity, a vertical component speed, parallel to RV, accelerating almost uniformly, but by virtue of the momentum and horizontal speed which the bomb possesses in common with the craft when released at R, the bomb continues, concurrent with increase of vertical component speed, to travel ahead at the initial horizontal component speed, except as this is gradually diminished by air resistance, with the net result that the bomb's actual path RBT, in air, is a modification of the strictly parabolic path, RUF, which it would follow in the same time of fall in a vacuum.

Figure 1:
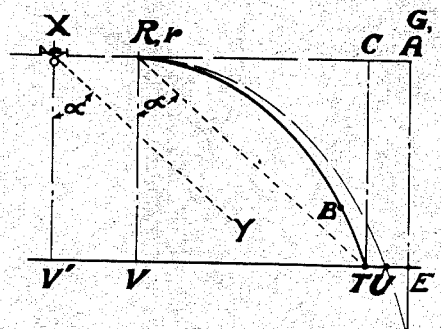
Fig. 1 illustrates in side elevation of a vertical plane, the trajectory of a bomb released from aircraft, with relations between its horizontal travel and the objective.
Figure 4:
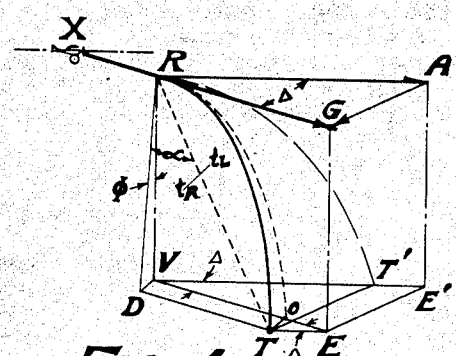
Fig. 4 shows in perspective, the trajectory of a bomb in vector relations to an aircraft's cross wind course.

Fig. 1 is the side elevation of a vertical plane XAEV¹ through the course of the craft RG over the ground, and assuming for this figure no wind, the course of the craft through the air coincides with its course over the ground and both the vacuum path RUF, and actual path RBT, would lie in this vertical plane. Fig. 4 will be described later, having to do with directional corrections of the craft's course, RG, which is not in line with the craft's heading RA through the air, but is the vector resultant of RA and the cross wind AG.

Referring again to Fig. 1, and Fig. 2, (plan view of Fig. 1) it will be seen that the problem of directing of the craft by signalling its pilot, is to align the vertical plane RCTV of the craft's course XRG in which plane the bomb path RBT will lie, to intersect the objective T by the time the craft shall have reached R, the range distance away, and not to left as X'RP or to right as X"RS. Having established correct alignment, XRT, as at X, the function of the bombsight proper is then to determine the arrival of the craft at R, when it is distant from the objective, the correct range, TV, of the bomb's trajectory.

Means for accomplishing the first function of directional alignment of the craft's course in azimuth, may, or may not be incorporated with the bombsight proper. These two functions are essentially separate in that alignment is accomplished by the pilot's control of the craft in accord with signals to turn and the alignment is maintained until the bomb is released, at R, whereas range VT, or arrival of craft at R, in range, is determined solely by the bomber's use of the bombsight proper, conditioned on such pre-alignment of the course and of the plane in which the bomb will fall. At high altitudes, however, accurate alignment of the course involves an accurate stabilized directional plane of sighting, RGEV, Fig. 1, Fig. 3, such as the pilot cannot use. Since the bomber's cross sight, $t_L$—$t_R$, Fig. 3, for sighting the objective with reference to range, can just as well comprise also the directional sighting plane RGEV, Fig. 3, without duplication of sighting members, the optical and control means for both equally important functions should be incorporated in a complete instrument, and my inventions comprise improvements in pilot-directing means as well as in range determination.

Imperfect stabilization of the directional sighting plane, RGEV, Figs. 1 and 2, and of the line of sight angle α with reference to true vertical, against aircraft oscillations is, except under the most favorable air conditions, the source of very large errors of direction and/or range, and my inventions comprise improvements in the application of gyroscopic stabilization.

Of little importance, contrary to popular impression, are deviations of the individual bomb from the known trajectory, RT (Fig. 1), which is normal to its type. These so-called "indeterminate" errors of the individual bomb are caused by slight manufacturing differences in bombs, as in weight, balance, shape, and friction, making for differences in the effective coefficient of friction wobbling trajectory, due to bent fins, and imperfections in release; flight path not strictly horizontal at release; craft oscillations imparted to the bomb at release; changes of wind and hence, of the bomb's air speed during its fall. The actual deviation of the bomb from its type trajectory, resulting from all of these sources, is known as to average degree for a given type of bomb, type of suspension, and altitude, but is indeterminate as to degree or direction in advance, for any one shot, hence, permits of no correction and is independent of skill or instrument. This average error is, however, so small that it would not alone materially detract from highly effective bombing against any but the smallest area objectives, even from great heights. The real problem of accuracy is, to reduce the far greater errors which have occurred on the average from the inherent instrumental inaccuracies, from sources of personal errors which the modes of operation heretofore used have permitted, and from short-comings in stabilization.

In Fig. 1, the horizontal ground lag, UT, of the bomb behind its vacuum trajectory, is due solely to air resistance, and this lag (symbol $G_L$) is a composite known ballistic function of the variables Altitude (symbol H)
Air speed (symbol $S_a$)
Type of bomb (symbol T. V.)

But the bomb lags against its direction of motion RBT, through the air. Hence, it not only lags by the ground lag UT in horizontal component direction, but also in a vertical component direction, i. e., it lags, as by TB, back of and above the corresponding vacuum position, U. In the time of fall (symbol $T_v$) of the bomb in a vacuum, to reach U from R, the bomb on its air path is at such position as B, hence the actual time of fall from R to T is $(T_v+T_L)$. This "time lag" (symbol $T_L$) is another composite known ballistic function of the same variables H, $S_a$, T. V., which determine ground lag.

During this time lag, the theoretical vacuum path would extend from U to F, a horizontal ground component UE, which may be called "time lag distance", and $UE = S_g \times T_L$ where $S_g$ is the symbol for ground speed.

Hence the "trail", ET, of the bomb hit, T, back of the ground projection E of the bomb's corresponding position F in the vacuum path, is Trail, $ET = UT + EU = G_L + (S_g \times T_L)$ Now, VE, range of the vacuum path in the actual time of fall, is simply the bomb's initial horizontal ground speed $S_g$ at release with which the bomb in vacuum continues to travel forward without retardation, multiplied by the actual time of fall $(T_v + T_L)$, i. e., $$VE = S_g(T_v + T_L)$$

and the true range, VT, is this distance VE, minus trail ET, i. e.

(1) True range, $$VT = S_g(T_v + T_L) - [G_L + (S_g \times T_L)]$$

which is the well-known ballistic expression of true range in terms of factors which are all determinable from ballistic data on bombs, in terms of the four flight variables.

It is evident that the true "range angle" (symbol $\alpha$) at which the line of sight, XY, Fig. 1, must be set ahead of true vertical XV' in order to subtend the range, is (2) $\alpha = \tan^{-1} \dfrac{\text{True Range}}{\text{Altitude}} = \tan^{-1} \dfrac{S_g(T_v+T_L)-[G_L+(S_g \times T_L)]}{H}$ Now, $S_g$ is determined by my synchronous system, as I will show.

$T_v$ is a known function of H only
$T_L$ is a known function of $S_a$, T. V., H
$G_L$ is a known function of $S_a$, T. V., H
$S_a$ is read in flight off any well-known air speed indicator carried on the craft.

H is altitude of craft above the level of the objective; i. e., height of craft above sea level minus height of objective above sea level; the latter is usually known before the bombing mission; height of craft above sea level is read off any calibrated altimeter carried in the craft, hence H is known in flight. I will call H hereafter "altitude".

T. V., "terminal velocity", is a known function of each type of bomb, and is a convenient value used in ballistic data corresponding to the bomb's coefficient of friction.

Thus, all factors in Equation 2 except $S_g$, are factors of one or more of the known flight variables, H, $S_a$, T. V.

To make clear the basis of my synchronous method for determining $S_g$, first consider the vacuum path RU, Fig. 1, as if there were no air resistance. There would then be no ground lag UT (symbol $G_L$), no time lag (symbol $T_L$) and no correction for air speed (symbol $S_a$) and Formula 1 becomes (3) Range (in vacuum) $= VU$ (Fig. 1) $= S_g \times T_v$ Now, actual range VT, Fig. 1, departs from vacuum range VU, by the distance UT, a correction which is small relative to the whole range, though here shown exaggerated for clarity of illustration, hence we may first consider the fundamental bases of different sighting mechanisms in terms of vacuum range, i. e., in terms of $S_g$ and H only, and then, the method of correcting for UT.

Figure 3:
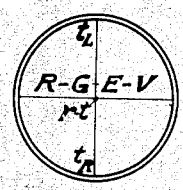
Fig. 3 illustrates an optical field of view through directional and range reticules.
Figure 6:
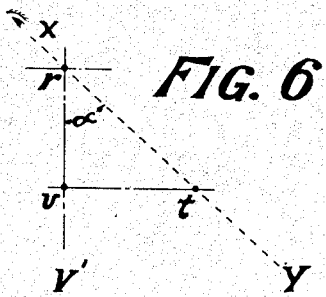
Fig. 6 illustrates the elements of a bombsight constituting a line of sight at the range angle.

First based upon the vacuum range, the elements of any bombsight may be considered to be a line of sight $rt$, Fig. 6, (corresponding to a straight line drawn from R to U, Fig. 1, (instead of RT) formed by eye alignment with two pins $r$ and $t$, adjustable respectively along a vertical leg $rv$ and a horizontal leg $vt$, at right angles to each other, or, any equivalent optical line of sight as $r-t$, axis of a telescope (Fig. 3).

Now, if spacing $vt$ be laid off to any scale proportional to the vacuum range, distance VU, Fig. 1, while $rv$ is, to the same scale, spaced proportional to the altitude VR, also a distance, then (4) $\dfrac{vt \text{ range (vacuum)}}{rv \text{ altitude}} =$ tan vacuum range angle $= \dfrac{S_g \times T_v}{H}$ and the line of sight $rt$ will thus be positioned to subtend the vacuum range, and the intersection of this line of sight with the objective (U, in case of vacuum) indicates instant for bomb release.

Again, if $vt$ be spaced proportional to the bomb's horizontal component "summital speed"

$$\left(\text{equal to } \frac{\text{range}}{T_v}\right)$$

while $vr$ be spaced to the same scale proportional to the bomb's vertical component summital speed $$\left(\text{equals } \frac{H}{T_v}\right)$$

then (4) $\quad \dfrac{vt}{rv}=\dfrac{\text{range}}{T_v}\div\dfrac{H}{T_v}=\dfrac{\text{range}}{\text{altitude}}=\dfrac{S_o\times T_v}{H}$ i. e., the same angle $\alpha$ is established by spacing both $vt$ and $rv$ either to corresponding component distances, range and altitude or, to corresponding horizontal and vertical, trajectory component, summital speeds.

Under the latter principle of spacings are many possible combinations, such as the following:—

| Calibrate $vt$ proportional to | Calibrate $vr$ proportional to | Then $\dfrac{vt}{vr}=$ |
|---|---|---|
| $\dfrac{1}{H}$ | $\dfrac{1}{S_oT_v}$ | $\dfrac{S_o\times T_v}{H}$ |
| $\dfrac{T_v}{H}$ | $\dfrac{1}{S_o}$ | Do. |
| a constant | $\dfrac{H\times \text{a constant}}{S_oT_v}$ | Do. |
| $\dfrac{S_o\times T_v\times \text{a constant}}{H}$ | a constant | Do. |

Figure 7:
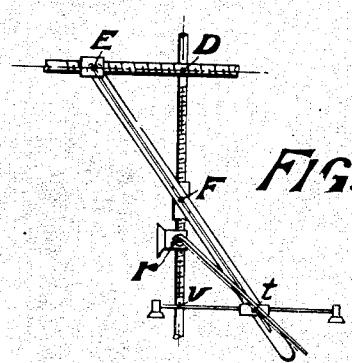
Fig. 7 shows the elements of the range setting mechanism.

My system comes under the last elemental category, i. e., I make $rv$, Figs. 6 and 7 a constant spacing, while I adjust $vt$ spacing proportional to $$\frac{S_o\times T_v\times \text{constant}}{H}$$

except as I correct for true range angle instead of vacuum range angle, as I will show.

True range VT, Fig. 1, is not $S_g\times T_v$, since the bomb in air does not continue throughout its fall, to travel ahead at its initial speed $S_g$, as it would without air resistance to retard it, but this horizontal component speed gradually diminishes. If I divide true range, Formula 1, by $T_v$, I will get a "summital equivalent speed" (symbol $S_s$) such that, multiplied by $T_v$, gives true range, and substituting this $S_s$ for $S_g$ in the above spacing of $vt$, thus making $vt$ proportional to $$\frac{S_s\times T_v}{H}$$

I have (5) $\quad \dfrac{vt}{vr}=\dfrac{S_s\times T_v}{H}=\tan \text{ true range angle, } \alpha$ I will now describe how, from basic ballistic Formula 1, I obtain by novel trans-positions, exceedingly close approximations to the advantage of simple application, i. e., how I obtain a very close approximation to the true value of $S_s$ in terms of the flight variables; altitude, air speed, ground speed, and type of bomb, and by novel means of mechanical application, accomplish the quick and simple mode of manipulation which I desire.

In Fig. 7 ED and DF represent the axes, fixed at right angles to each other, of two separately rotatable screws carrying respectively nuts E and F.

According as these screws are rotated, nuts E and F are displaced to variable spacings ED and FD. A straight axis link, EF$t$, is pivoted on a pin on nut E and is slidably pivoted at a pin in nut F, the pin being slidable in a slot or groove along the link axis. Parallel to ED and at fixed spacing D$v$ from it, is the axis of a guide $vt$ along which may slide a member carrying pin $t$, which is also slidable with reference to the axis of link EF$t$, so that point $t$ is always at the intersection of $vt$ and EF$t$, whatever the spacings ED and DF may be. The four axes ED, $vt$, D$v$ and EF$t$ thus constitute a plane geometrical figure such that EDF and $t$vF are similar right angle triangles in which $$\frac{vt}{DE}=\frac{vF}{DF}$$

or since $DF=Dv-vF$ (6) $\quad vt=\dfrac{vF\times DE}{Dv-vF}$

Now, if I space DE proportional to the before mentioned "equivalent horizontal summital velocity"

$$S_s=\frac{\text{true range}}{T_v}$$

Then $$DE=\frac{\text{true range}}{T_v}\times K_1$$

in which $K_1$ is a constant according to the scale employed.

Again, if I space DF such that (7) $\quad \dfrac{vF}{Dv-vF}=\dfrac{T_v}{H}$ (a function of altitude only)

then substituting the above values for DE and $$\frac{vF}{Dv-vF}$$

in Equation 6 I will have (8) $\quad vt=\dfrac{\text{true range}}{T_v}\times K_1\times\dfrac{T_v}{H}=\dfrac{\text{true range}}{H}\times K_1$ In Fig. 7, $rt$ is a range arm, pivoted at $r$, a fixed distance $vr$ from the guide axis $vt$, and bearing by spring not here shown, always against pin $t$, which is located by link EF$t$, so that the axes $vr$, $rt$, $tv$, constitute in plane figure a right angled triangle. I make $rv=K_1$, and substituting $rv$ for $K_1$, in Equation 8, I have $$\frac{vt}{rv}=\frac{\text{true range}}{H}$$

i. e., $vrt$ is the true range angle when ED and DF are spaced in the above proportions.

Referring to Equation 7, $T_v$ is a known function of H, hence $$\frac{vF}{Dv-vF}=\frac{T_v}{H}$$

is a function only of the one factor, H, and I calibrate a scale to which distance DF is spaced by a single setting according to the altitude H, so that Equation 7 is true.

I will now describe how I space DE proportional to such a summital velocity $S_s$ as is substantially equal to $$\frac{\text{true range}}{T_v}$$

If I equate $$S_s=\frac{\text{true range}}{T_v}$$

to $(S_g-S_x)$ in which $S_x$ is craft's speed of approach, and $S_x$ is a speed correction to be determined, then the correct value for $S_x$ correction must be (9) $$S_x = S_g - \frac{\text{true range}}{T_v}$$

And substituting in Equation 9, the expression for true range, Equation 1, $$S_x = \frac{S_g - S_g T_v + S_g T_L - G_L - S_g T_L}{T_v}$$

or $$S_x = \frac{S_a T_v - S_g T_v - S_g T_L + G_L + S_g T_L}{T_v}$$

or

(10) $$S_x = \frac{S_a T_L - S_g T_L + G_L}{T_v}$$

This is the correct value for $S_x$ in terms of the ballistic factors $S_a$, $T_L$, $S_g$, $G_L$, $T_v$.

Now, $T_L$ and $G_L$ are different functions of altitude, air speed, and type of bomb and may be expressed $$T_L = \frac{A + Bb}{c}$$

$$G_L = \left(\frac{A' + B'b'}{c}\right) S_a$$

where A, B, A', B' are known ballistic functions of altitude (H) only,
b, b', are known ballistic functions of air speed ($S_a$) only,
c, is a known ballistic function of type of bomb (T. V.) only, and substituting the above expressions for $T_L$ and $G_L$ in Equation 10, we have $$S_x = \frac{S_a\left(\frac{A+Bb}{c}\right) - S_g\left(\frac{A+Bb}{c}\right) + S_a\left(\frac{A'+B'b'}{c}\right)}{T_v}$$

or $$S_x = \frac{S_a(A+Bb+A'+B'b') - S_g(A+Bb)}{c \times T_v}$$

and without changing the value of this equation it may be rewritten

(11) $$S_x = \left[\frac{S_a(A+Bb+A'+B'b')}{A+Bb} - S_g\right] \times \frac{A+Bb}{T_v} \times \frac{1}{c}$$

Now, the ratio $$\frac{A+Bb+A'+B'b'}{A+Bb}$$

varies so slightly even for extreme combinations of the flight variables, altitude and air speed, which determine it, that the substitution for that ratio of a constant, (symbol K), of value chosen to give least probable error over usual combinations of altitude and air speed between their practical limits, introduces negligible range error, and substituting K for the above ratio, Equation 11 becomes

(12) $$S_x = (S_a K - S_g) \times \frac{A+Bb}{T_v} \times \frac{1}{c}$$

Again, the ratio $$\frac{A+Bb}{T_v}$$

varies chiefly according to altitude, as A, B, and $T_v$ are all functions of altitude only. b is a function of air speed only, but varies much less than in direct proportion to air speed, and the effect of b variation upon that ratio is so small for all air speeds within practical limits, that an average value for b, based upon an assumed average air speed, might be used with small errors in the values of the ratio, but I render such errors still less by calculating the true values of b according to the air speeds which most generally occur at various altitudes, for the type of bombing aircraft in use, and thus I make a single setting for altitude introduce values of this multiplier ratio in exceedingly close correspondence even for combinations of air speeds and altitudes other than normal, and of exact values for normal combinations, so that the range error due to this approximation will average over the whole range of combinations between practical limits, of the order of only about 15 feet, including unlikely combinations.

It will now be seen that Equation 12 expresses the value of the speed correction $S_x$ which I actually introduce, by mechanisms which I shall describe, so that a spacing proportional to $S_a$ setting for air speed is first multiplied by a constant K; a spacing proportional to $S_g$ is subtracted from $S_a K$; the spacing proportional to $(S_a K - S_g)$ is then multiplied by a ratio substantially equal to $$\frac{A+Bb}{T_v}$$

as determined by a single altitude setting; and $$(S_a K - S_g) \times \frac{A+Bb}{T_v}$$

is then divided by c according to a single setting for type of bomb.

The spacing DE, Fig. 7, should, as I have described, be proportional to the equivalent summital speed $S_s = S_g - S_x$, and I accomplish this by spacing DE according to the difference between speed of approach $S_g$ as determined by the synchronous process, and the spacing proportional to the $S_x$ correction as above described.

I have now described the elements in principle, of my method of range angle determination, as illustrated by diagram, Fig. 7, comprising the setting of a range arm $rt$ at the range angle $\alpha$ ahead of normal vertical axis $rv$, based upon spacing $vt$, (at right angles to the fixed leg $rv$) proportional to the product of horizontal summital velocity $S_s$ of the bomb, by the vacuum time of fall, $T_v$, through altitude H, divided by altitude H, all by means of locating a link $EFt$ by two spacings DE and DF, so that DE is proportional to the difference between speed of approach $S_g$ and the speed correction $S_x$, and, DF equal to $$vF \times \frac{H}{T_v}$$

In this mechanical means the only approximation is in the value of the correction $S_x$, involving small range errors for other than normal combinations of air speed and altitude. I have described the novel developments by which I have re-expressed the true ballistic formula, range $= S_g(T_v + T_L) - (G_L + S_g \times T_L)$ as range $= (S_g - S_x) T_v$ I will now describe the mechanical relationships of all parts essential to the spacing of DE and DF in the above accord, comprising the means of synchronizing the line of sight into visual coincidence with the objective, and involving but one presetting each for known altitude, air speed and type of bomb, resulting in the automatic determination of the instant of bomb release.

Figure 8:
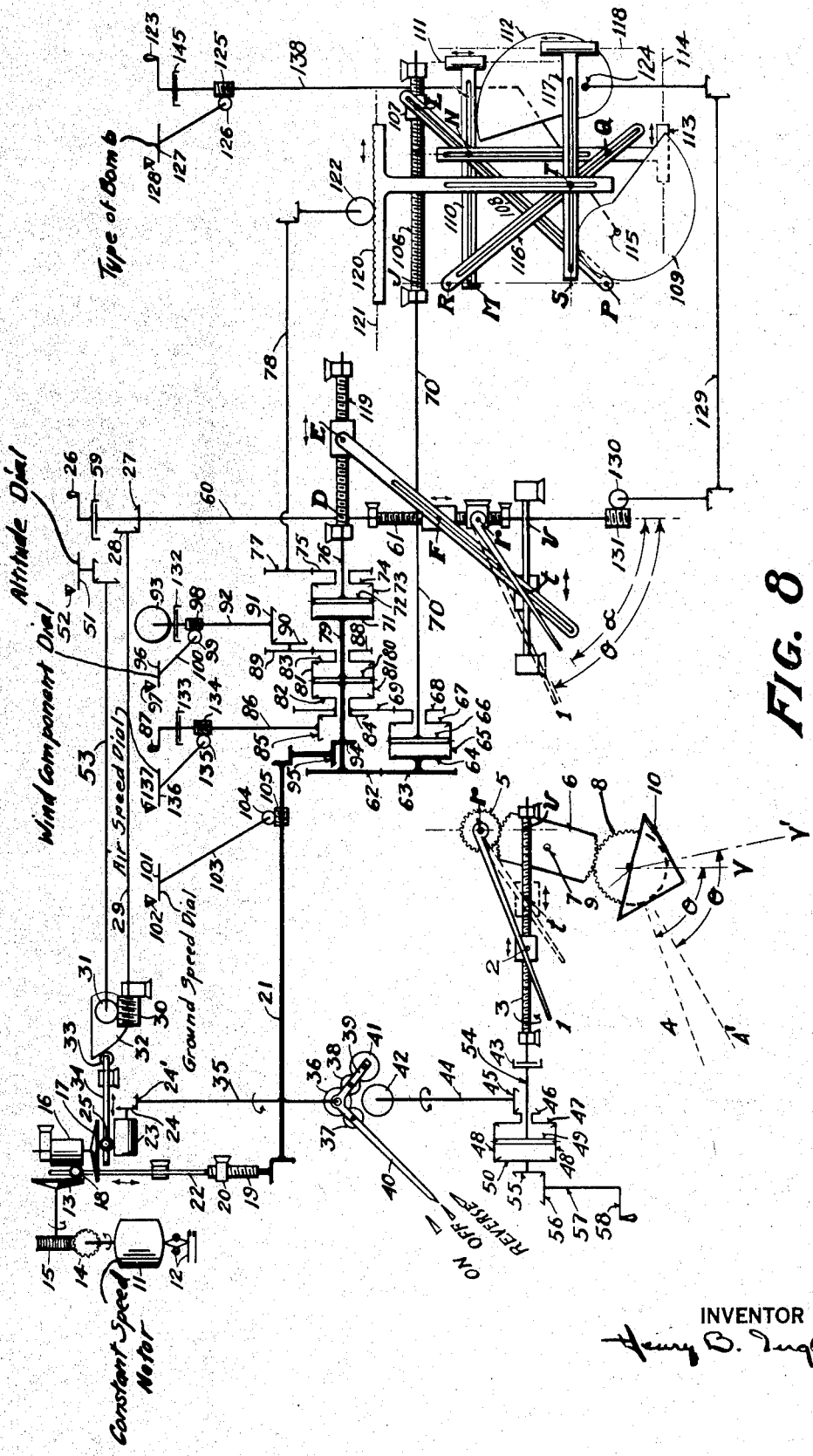
Fig. 8 is a schematic diagram showing the interrelations between essential mechanisms of the bombsight proper.

Schematic diagram, Fig. 8, shows, in the manner familiar to engineers, all essential mechanical relations. Description of Fig. 8 may be more clearly visualized by reference to corresponding parts with like designations as shown in Figs. 32 to 39 inclusive. The only differences will be found to be the omission or introduction of gears suitable to other disposition of arrangement than shown in the schematic diagram, but no difference in the inter-relations essential to the system.

Parts represented schematically in Fig. 8 are designated the same as like parts detailed in usual manner in other figures. Thus, all parts of Fig. 7 are readily identified in Fig. 8 by like letters.

In the center of Fig. 8 will be seen, in addition to like parts of Fig. 7, a pickup arm $rl$, shown in dotted lines at a random angular position $\theta$, and ahead of the range arm, $rt$. The mechanism in the center group, Fig. 8, corresponding to Fig. 7, has to do with the setting of the range arm, $rt$, and nothing to do with the positioning of the pickup arm, $rl$. Hence, I show the latter in a group, separated for clarity, at the left, including the mechanism which sets it, in full lines, wherein the same range arm, $rt$, shown in full lines in the center group, is shown dotted and in the angular position $\alpha$ determined by the center group mechanism. Thus, actually, the left group should be superimposed upon the center group in a parallel plane so that the pivotal axis, $r$, in both groups, coincides.

The group at the extreme right of Fig. 8 may be called the $S_x$ correction unit, which will be described later.

It may clarify subsequent description, to distinguish in Fig. 8, the left group comprising parts driven by motive power 11, from the rest of Fig. 8, having to do with settings and not otherwise moved, by tracing the transmission from constant speed source of power 11, to the driving of pin 2 nut toward $v$ at any desired constant rate. As $rl$ arm bears by pressure of spring, not here shown, always against pin 2, $rl$ rotates always as nut 2 is moved along screw 3, and mirror 10 geared to arm $rl$, through 5, 6, 8 gears, is rotated in the same direction as arm $rl$, but, as will be shown, at half the angular rate.

11 represents any suitable source of motive drive of disc 13, as electric motor or spring clockwork, having suitable governor device, represented by 12, to maintain disc 13 rotation at a predetermined constant speed, and 14 and 15, worm and gear integral respectively with shafts of the motor, and disc 13, represent any form of transmission ratio to drive disc 13 at the predetermined speed from motor 11, which may have another speed. It will also be understood that any gears in Fig. 8 such as 14 and 15, or 24, 24', merely transmitting rotation of one shaft to another not in the same line, are not essential to the system where the parts may be obviously otherwise disposed, to require more than one set of gears or, to eliminate the gears, the essential parts, ratios, and relations being clear upon further description. For example, if the group of mechanism from shaft 35 down, be turned around at right angles, shaft 35 and drum 23 shaft could be brought in line as one continuous shaft, without the need of the bevel gears 24, 24', to connect the shafts as here disposed at right angles to each other.

Disc 17, integral with cylinder or drum 16, is rotatable about the axis perpendicular to and in the plane of the axis of disc 13, and is rotated by rotation of disc 13, through the intermediary of a ball or wheel 18, performing the function of an idler gear free to revolve about the axis of shaft 22, and in frictional mesh with the hardened and ground surfaces of both drum 16 and disc 13. The rate of rotation of 16 and 17 may be changed from zero where idler 18 is pushed to center of disc 13, to maximum speed by shifting idler 18 out to edge of disc 13, and the drive ratio is proportional to the distance of idler 18 out from disc 13 center. While idler 18 is free to revolve about shaft 22 axis, it is integral with this shaft with respect to displacement of shaft 22 in arrow directions, so that the speed ratio between 13 and 16 is variable by displacement of shaft 22 according to the adjustment for speed of approach by the synchronizing regulator, as will be described later.

Similarly, the axis around which drum 23 is rotatable, is at right angles to, and in the plane of, the axis of disc-drum 17—16, and the speed ratio between 23 and 17 is determined by the displacement of idler 25 in arrow directions, and the ratio is proportional to the distance of the idler out from center of disc 17. This displacement of idler 25 with carrier shaft 34 is according to rotation of cam 32 against which shaft roller 33 always presses by spring, not here shown, through a setting 26 for altitude, which will be described later. A practical means of construction of such disc-ball-drum transmission is detailed in Figs. 36, 37.

Figure 36:
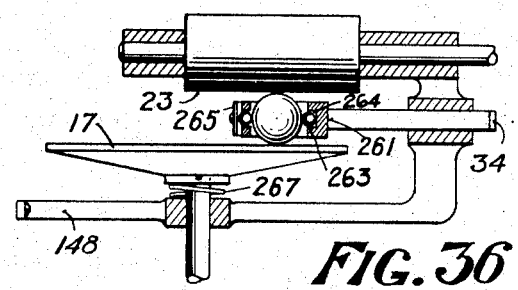
Fig. 36 shows in side elevation, the disc-ball-drum variable speed transmission, with details of a suitable ball carrier.
Figure 38:
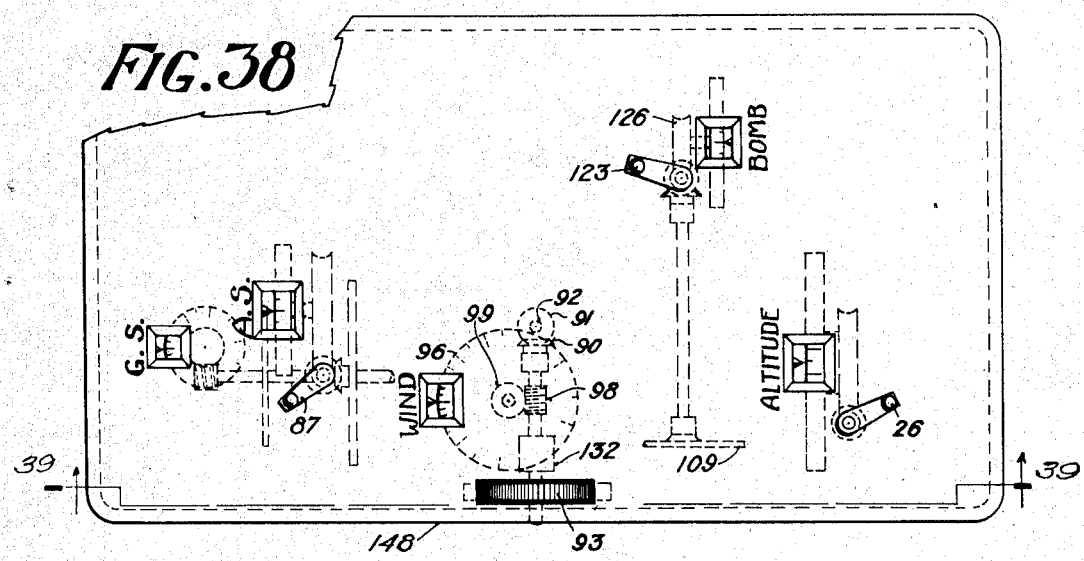
Fig. 38 is a plan view of the instrument, and Fig. 39 a side elevation sectionalized along 39—39 of Fig. 38, showing all dial sets mechanism, with exception of the speed correction unit (which is sufficiently clear from Fig. 8).
Figure 39:
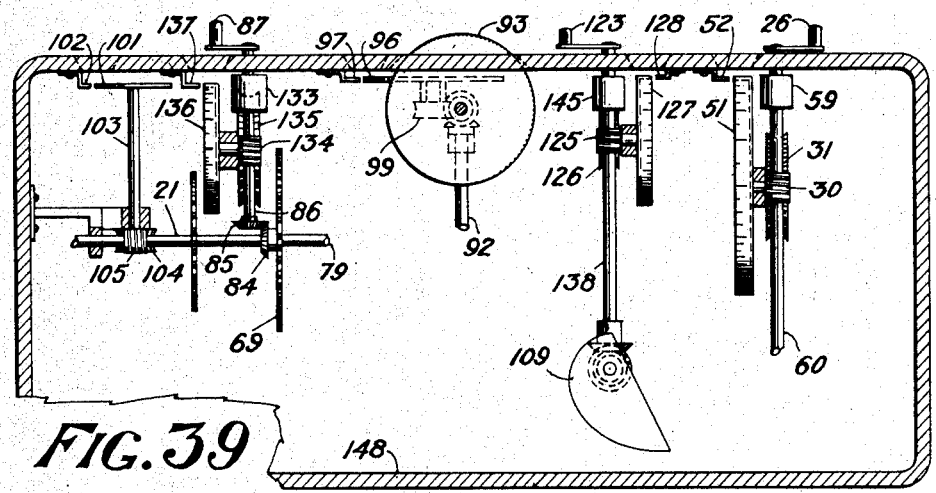

Here, guide shaft 34, pinned at 260 (Fig. 37) integral with ball carrier 261, is square in section, thus holding carrier 261 (Fig. 36) against rotation. Ball 25 is held accurately located with reference to the carrier by roller 262 pinned in the carrier on that side to which the ball is pressed by the rotation of disc 17; and is held, axially, along a line parallel to the drum 23 axis, against ball 263 in socket 264 of the carrier, by a spring 265 pressing against ball 266. Frictional contact of ball 25 with the disc and drum, may be insured by end play pressure of disc 17 against the ball, by spring 267 (Fig. 36). The same figures may represent also the 13—18—16 disc-ball-drum transmission, Fig. 8.

Shaft 35 is thus driven in rotation through suitable gears 24, 24', by drum 23, at a constant speed depending upon the positions of idlers 25 and 18, and rotation of shaft 35 transmits to shaft 44 the same or opposite rotation, according as tumbler-gear-train arm 40 is moved from "off" position shown (Fig. 34), in which 42 is not driven, to "on" or "reverse" positions, in which gear 42 is meshed respectively with gear 36 integral with shaft 35, through idlers 38, 41 or through idler 37. A practical form of this tumbler gear train is detailed in Fig. 34.

Arm 40, integral with gear carrier 39, carries roller 270 bearing by spring 271 against a camway 272 so shaped as to hold arm 40 either at "off" or "on" position notches, but requiring 40 to be manually held at reverse connection, from which 40 will spring back to off position unless held at reverse.

Rotation of shaft 44 in "on" or "reverse" tumbler gear connection with motive drive, transmits linear travel of nut 2 respectively toward or away from $v$, through gear train 45, 46, 47, 48, 49, shaft 54, integral with 49 carrier of differential gears 48, clutch 43 and screw 3. 47 to 50 represent a well-known differential, in which shaft 54 is rotated as the arithmetic sum or difference of rotations of the differential halves, 47 and 50. Gear 50 constitutes part of a manual setting gear train by which rotation of 54 can be added to or subtracted from its rotation by motive drive by shaft 44, but 50 is normally stationary, when screw 3 is then rotated by the motive drive alone, at a constant speed through the half 47 of the differential.

The function of clutch 43 is to allow rotational slippage between screw 3 and shaft 54 when and only when screw 3 is stopped against rotation, when nut 2 reaches either stop limit of its travel, and when gear 42 is connected to motive drive, in which case motive drive can continue without forcing screw 3 in torsion beyond a slight frictional twist through the slipping clutch 43. All clutches may be alike, and a suitable form is detailed in Fig. 35.

Figure 35:
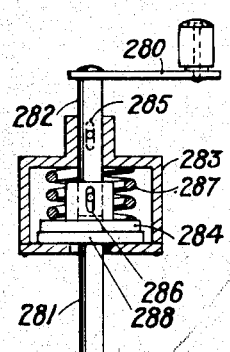
Fig. 35 shows a suitable form of the limit slip clutch.

Thus, Fig. 35 may represent clutches 133, 59, 145, Fig. 8, with cranks 87, 26, 123, also clutches 132 and 43, Fig. 8, replacing crank 280 by regulator wheel 93, and omitting the crank for clutch 43. Shaft 281, Fig. 35, is rotated by turning shaft 282 unless 281 is stopped, when shaft 282 may then slip in rotation. Members 283 and 284 are pinned to rotate with shaft 282, but slotways 285, 286, allow axial movement of both members along the shaft. Spring 287 compression, forces 284 against one side of flange 288 of shaft 281, and member 283 against the bottom face of flange 288, so that shafts 281, 282, are in frictional mesh without any forces along the shaft axes external to the unit.

Rotation of gear 5, integral with pickup arm 1, pivoted at r, rotates, through idler 6 pivoted at 7, the gear 8 of twice the diameter of 5, hence in the same direction but at half the angular rate. The optical line of sight reflected from the mirror surface 10 makes the same angular movement as the pickup arm 1 by this well-known gearing of the mirror in the ratio of one to two, hence, in the diagram Fig. 8, 4 may represent the optical line of sight through the cross reticule which, as will be shown in description of stabilization, is always at the same angle $\theta$ with reference to true vertical that pickup arm $r1$ is with reference to the instrument's normally vertical axis $rv$, in other words, considering $rv$ axis as vertical, line of sight 4 parallels arm axis $r1$.

All of Fig. 8 may be considered as a side elevation of the instrument unit holding the plane of the sheet vertical, and while the whole instrument considered integral with the aircraft, be tilted about a horizontal axis normal to the plane of the sheet as by placing 9V' vertical, and axis of screw 3 out of horizontal, as in a nosing up of the craft, the optical line of sight through the cross reticule will then be seen as 4', retaining the same angle $\theta$ with respect to true vertical 9V' as arm 1 still bears to instrument axis $rv$. The angular rate of change of $\theta$ between true vertical V or V' and apparent line of sight 4 or 4' through reticule axis $r$—$t$, Fig. 3, remains, despite oscillations of the whole instrument with the craft, the same as the angular rate at which pickup arm 1 is driven with respect to axis $rv$. Hence, it is not necessary that axis of 3 be disposed horizontally or $rv$ be disposed vertically, as I here show them to be disposed with respect to the aircraft in which the instrument is mounted, but only that the stabilized angle of optical line of sight with reference to the true vertical be made the same as the angle $2rv$, however the mechanism be disposed.

Considering the other half 50 of the differential, it will be seen that through gear 55, integral with 50, and gear 56, integral with shaft 57 and crank 58, manual rotation of crank 58 will rotate shaft 54 through half of differential 50 and according to the direction of cranking will add such rotation of half of differential 50 to, or subtract it from, whatever rotation half of differential 47 may indicate by tumbler gear connection in one direction or the other. Hence, the line of sight, or field of view, including the line of sight, may be shifted toward or away from vertical either by connecting motive drive tumbler gears in "on" or "reverse" gear connections without manual rotation of crank 58, or, by manual cranking of 58 alone with motive drive disconnected as shown, or, both, in cumulative or subtractive directions. The advantage of this differential means of shifting the field of view is to enable the bomber to quickly shift the line of sight 4 manually upon the objective which may be ahead of or behind the position 4 as left from a previous approach, to commence synchronizing the rate of movement of 4 in coincidence with the objective, at any angle $\theta$ at which the objective may be picked up by line of sight 4 without changing the speed ratio, nor the rate of movement at which nut 2 will start upon throwing drive "on", from that previously established, i. e., by merely throwing 40 "on" so as to drive 2 toward $v$ and hence 4 toward vertical, or "reverse", so as to drive 4 further ahead of vertical by motive drive till 4 intersects the objective or, if the bomber desires quicker pickup, to add to such constant rate by motive drive, whatever additional speed he desires by hand cranking of 58. Upon intersection of 4 with the objective, the crank 58 is let go and 40 is thrown "on" if not already connected, when the line of sight 4 instantly proceeds to move back at the motive drive rate of nut 2 travel which may have been left established from a preceding approach from the same direction, or as approximately pre-set. The new approach speed may or may not be close to the preceding speed, according as the new approach is or is not nearly in the same direction and with same wind and air speed combination, but the means for shifting the field of view by hand is of advantage in case the new speed is close to the preceding approach speed by rendering it unnecessary to change the motive drive rate, as would be necessary to shift the angular position of 4 toward vertical in case the objective is picked up behind the previously left position of 4. If the objective lies ahead of the previously left position of 4, then 4 may be shifted ahead by motive drive "reverse" connection without changing the rate nor cranking 58, or speeded up by also cranking 58, or, by cranking 58 alone, leaving 42 disconnected until 4 intersects objective when, in any event, 41 is meshed with 42 by throwing motive drive "on".

The hand crank ratio through bevels 55, 56, may be any desired ratio to enable nut 2 to be shifted faster than by motive drive, for quick shifting of 4 into coincidence with objective. The motive drive ratio between rate of movement of nut 2 and motor 11 bears a definite relation to altitude and speed of approach through ratios 13 to 16—17 and 17 to 23, such that movement of 2 is directly proportional to speed of approach and inversely proportional to altitude, i. e., actual speed of nut 2 travel is $$S_a \times \frac{rv}{H}$$

Thus, I displace idler 25 through cam 32, by altitude set 26 by setting calibrated marks of disc 51 against fixed index 52, so that the ratio between speed of rotation of drum 23 and disc 17 is inversely proportional to altitude; and I displace idler 18 so that the ratio of speed of rotation of drum 16 to speed of rotation of disc 13 is directly proportional to the actual speed of approach. When the altitude ratio has been set to known altitude, it only remains to shift idler 18 until line of sight 4 follows back in "synchronized" coincidence with or relation to the objective, when nut 2 is then moved at a rate directly proportional to the actual speed of approach, hence the position of idler 18 and corresponding position in rotation of shaft 21 which displaces 18—22 in proportion to rotation in fixed nut bearing 20, of screw 19 against which shaft 22 always presses by spring, not here shown, is a direct measure of the actual speed of approach, and a proportional rotation through worm and gear 105, 104 of disc 101 calibrations, reading against fixed index 102, furnishes indication of the speed of approach.

While the range angle $\alpha$ of the range arm $rt$ is thus set, as will be described, in accord with the synchronous speed of approach without the need of reading what the speed is, an indication of speed of approach has value for navigational information aside from the immediate bombing approach in sight of the objective. The operator of this instrument can determine the craft's ground speed in a few second's time by merely setting dial 51 altitude calibrations to index 52, according to altitude, and then, sighting any ground object along 4 in the direction of the craft's ground travel, adjusting 93 till 4 remains coincident with or at fixed space from the sighted object, and reading the true ground speed off dial 101.

It will be noted that shaft 21 is rotatable only by rotation of shaft 79, which by other disposition might be a continuation of it or, as through gears 94, 95, as shown. Shaft 79 is rotatable only through rotation of integral member 80 as the differential results of rotation of either half or both halves, 82, 83, of the differential, as no other connection to shaft 79 can rotate it against the sufficient frictional braking which is provided to hold all sets in place after manually setting the dials.

Manual rotation of air speed setting crank or wheel 87, rotates the half 82 of differential through clutch 133, shaft 86, and gears 85, 84. Worm 134 integral with shaft 86, meshes with worm wheel 135 integral with shaft and dial 136, which latter is calibrated to register air speed against index 137, so that rotation of the half 82 of differential and 80, and integral shaft 79, against the frictionally locked setting of differential half 83, corresponds to the displacement of idler 18 and to speed ratio between disc 17 and drum 23 proportional to the air speed set.

Similarly, if air speed set 87, and hence differential half 82 be left frictionally locked in the position set manually, then manual rotation of the regulator wheel 93 rotates shaft 79 through clutch 132, shaft 92, and gearing 91, 90, 89, 88, and thus differential half 83 and member 80 and integral shaft 79.

Thus idler 18 could be positioned to produce the synchronous rate of movement of 4, by rotating either the air speed set or the regulator 93, hence establishment of accurate synchronism of the sight 4 and accurate indication of the speed of approach are not dependent upon setting 87 and dial 136 precisely according to known air speed, but the air speed set 87 serves two purposes for which it should be set according to known air speed before synchronizing by regulator 93. The chief function of the air speed set 87 is that it introduces through transmission gears 85, 84, 69, 68, and differential half 67, the air speed in the factor $S_aK$, which, in combination with the setting of differential half 64 in proportion to $S_g$, introduces the factor $(S_aK-S_g)$ into the $S_x$ correction unit at the right of Fig. 8 through shaft 70. The second function served by the same air speed setting of 87 is, that when differential half 82 is set according to air speed, then the setting of the regulator 93 to obtain synchronism of sight 4, is directly proportional to the difference between the speed of approach and air speed, i. e., approximately to the wind component in line with direction of approach. And dial 96, rotated in proportion to regulator 93 setting, through shaft 100 and worm and gear 98, 99, indicates against index 97, this wind. Thus, by setting 87 for air speed, and also setting up- or down-wind speed calibration of dial 96 by 93 set, for estimated up or down wind, the speed ratio 13 to 16 may be thus preset to a resultant rate of drive of nut 2 closely proportional to the actual speed, and but little regulation of 93 is needed to obtain exact synchronism in the shortest time. Also, for navigational use, by flying a ground course up or down wind, and synchronizing 4 on any ground object, dial 96 then registers the true wind velocity.

Now the position in rotation of shaft 79 is directly proportional to existing ground speed of synchronization upon a stationary ground object, and to the setting of gear 71 (half of the right hand differential) through gears 62, 63, also 64 (half of the lower differential). The setting of 71 proportional to ground speed $S_g$, in combination with the setting of 74, the other half of the right-hand differential through gears 75, 77, shaft 78 and gear 122 as an output from the $S_x$ correction unit, proportional to $S_x$ rotates 72 and integral shaft 76 and screw 119 and hence spaces DE in proportion to $(S_g-S_x)$ factor of Equation 12. How 122 is rotated proportioned to $S_x$ will now be described, referring to Formula 12.

Air speed, $S_a$, is to be multiplied by the constant K, and this is mechanically accomplished by making the ratio between diameters of gears 68 and 69 equal to K, whence half 67 of the lower differential is, through gears 68, 69, positioned in rotation proportional to $S_aK$. The half 64 of this differential is, as already traced, positioned in rotation directly proportional to the speed of approach $S_g$ as soon as sight 4 is synchronized upon the objective, and member 66, integral shaft 70 and screw 106 are positioned in rotation, and hence spacing JL of nut 107 is set, proportional to $(S_aK-S_g)$.

In the speed correction unit right hand group of mechanism, Fig. 8, lettered points refer to intersections of the axes of various parts, projected into the flat plane of the sheet, though the various parts are actually in parallel planes so that they can pass each other by movements in arrow directions. Thus, while interrelated by pins common to the intersections of overlapping members, links 108 and 116 pivoted respectively at P and R fixed points, are free to separately swing about their pivots; bars 110 and 117 are free to move past each other in arrow directions along guides whose axes only are here represented by dot and dash lines; bars 113 and 120 are similarly free to move past each other in arrow directions along their guide axes at right angles to the guides of 110 and 118.

Pin L is always common to the intersection in flat plane projection, of the axis of screw 106 and the slot axis of link 108; pin N is always at the common intersection of the slot axes of link 108 and bars 110 and 113; pin T is likewise always at the common intersection of the slot axes of link 116 and bars 117 and 120.

Point L is the center of nut 107 and is movable to variable space JL by rotation of screw 106, shaft 70; bar 110 is movable along its guide to variable spacing PM by corresponding position in rotation of cam 112 against which bar 110 is held, by spring not here shown, pivoted at 124, and rotated by shaft 129 in accord with altitude set 26 through such transmission as worm and gear 131, 130; bar 117 is movable along its guide for variable spacing RS by corresponding position in rotation of cam 109, against which it bears, by spring not here shown, pivoted at 115, and rotated by shaft 138 of the type of bomb set 123.

Figure 9:
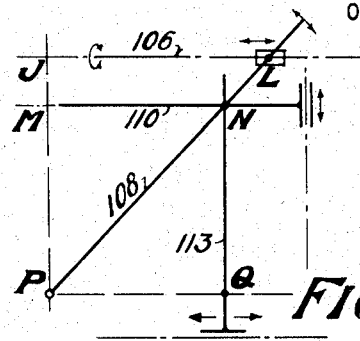
Figs. 9 and 10 are geometric illustrations of the principle of operation of the correction unit.
Figure 10:
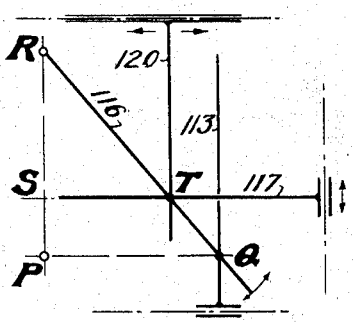

Now the operation of this $S_x$ correction mechanism will be more clear by description with reference to Figures 9 and 10, showing all the essential relations of the geometrical figures formed by the projection into a flat plane of all axes and pivots of the members correspondingly designated in Fig. 8.

In Fig. 9, by similar triangles, MNP and JLP, $$\frac{MN}{JL}=\frac{MP}{JP} \text{ or } MN=\frac{MP}{JP}\times JL$$

But as above described for Fig. 8, JL is the spacing of nut 107 or L proportional to $(S_aK-S_g)$ factor of Formula 12, and spacing MP, or ratio MP to the fixed spacing JP, is established by position in rotation of cam 112 by the altitude setting of 26, hence $$\frac{MP}{JP}$$

is a function of altitude, and the cam is designed to make $$\frac{MP}{JP}$$

proportional to $$\left(\frac{A+Bb}{T_v}\right)$$

which, as I have previously explained, I calculate as a function of altitude.

Thus, MN spacing, resulting from the setting (Fig. 8) of 26 for known altitude, and of 87 for known air speed, and of 93 to establish synchronism of sight 4 on the objective, is proportional to $$(S_aK-S_g)\times\left(\frac{A+Bb}{T_v}\right)$$

In Fig. 10, by similar triangles RQP and RTS, $$\frac{ST}{PQ}=\frac{RS}{RP} \text{ or } ST=\frac{RS}{RP}\times PQ$$

But PQ (=MN) is, as above described, the spacing of bar 113 proportional to $$(S_aK-S_g)\times\left(\frac{A+Bb}{T_v}\right)$$

and spacing RS, or the ratio RS to the fixed spacing RP, is established by position in rotation of cam 109 by setting dial 127 calibrations (Fig. 8) to index 128 according to type of bomb through set 123, hence $$\frac{RS}{RP}$$

is a function of type of bomb, and the cam 109 is designed to make $$\frac{RS}{RP}$$

proportional to the $$\frac{1}{c}$$

function of type of bomb.

Thus, since $$ST=\frac{RS}{RP}\times PQ$$

ST is a spacing proportional to $$(S_aK-S_g)\times\left(\frac{A+Bb}{T_v}\right)\times\frac{1}{c}$$

or to $S_x$, Formula 12.

Since pin T, Fig. 8, slides bar 120 axis always in common intersection of axes of link 116 and bar 117, bar 120 spacing ST, and the corresponding position in rotation of gear 122 in mesh with rack of bar 120, is proportional to $S_x$, hence 122 rotates its integral shaft 78 and gear 77, and, through gear 75, rotates differential half 74 proportional to $S_x$. As previously described, spacing DE, Fig. 8, is proportional to the differential resultant of the rotations of differential half 71 proportional to $S_g$ upon establishing synchronization of sight 4, and the half 74, proportional to $S_x$, thus DE is spaced proportional to $(S_g-S_x)=S_t$ which, as already described, in combination with the spacing DF by the altitude set 26 so that $$\frac{vF}{Dv-vF}=\frac{T_v}{H}$$

(Equation 7), thus sets the range arm $rt$ at the range angle $\alpha$ for any combination of altitude, air speed, type of bomb and speed of approach.

It will be noted that my entire system for determination of range, covered by Fig. 8, is devoid of electrical make-and-break contacts which are the source of probable malfunction in such apparatus, also, that none of the essential relationships can be thrown out of order by inadvertent manipulation of any of the manual sets in whatever sequence, direction, or speed, nor by attempting to crank the sets beyond the limiting stops of the members set.

Thus, the three members moved by altitude set 26, Fig. 8, viz., cam 32, which displaces idler 25, cam 112, which displaces bar 110, and screw 61, which displaces nut F, are all stopped at their extreme limits corresponding to the abutment of nut F against stops bearing screw 61, and any further rotation of 26 merely slips clutch 59, without straining shaft 60 in torsion beyond the slight frictional grab of the slipping clutch; the rotation of dial 51 is geared to shaft 60, hence the relation of the indications of the altitude set, to the movements of the three members set, is permanent and is never thrown off by cranking 26 beyond limits. Similarly, rotation of screw 119 which displaces nut E, by air speed set 87 and/or regulator 93, and by rotation of shaft 78 from the correction unit, is stopped by abutment of nut E against either bearing stop, and any further rotation of 87, 93 or 123, merely slips clutches 133, 132 or 145, without affecting the permanent relations between the respective dials 136, 96 or 127 to the members moved in correspondence with the dial indications: rotation of cam 109 is limited at both extreme positions by suitable stops, not here shown, and clutch 145 slips if 123 is cranked beyond the stop limits. Similarly, rotation of screw 3, either by motive drive or, hand cranking of 58, is stopped by the abutting of nut 2 at screw 3 bearing stops, and further cranking of 58 or, motive drive of shaft 44, merely slips clutch 43, without damage or jamming of mechanism.

The arrival of the motive driven pickup arm $rl$ into angular coincidence with the preset range arm $rt$, when the bomb or bombs should be released, is visible to the bomber looking along 4 as the pin $t$, which is holding the range arm $rt$ already in position at the range or bomb release angle $\alpha$, projects also into the path of $rl$ which thus stops its rearward motion at the bomb release angle $\alpha$, resulting in the stoppage of the rearward movement of line of sight 4 and, the apparent jumping of the objective, till then synchronized in coincidence, back of 4 or, $r$—$t$. Fig. 3.

If a single bomb is to be dropped, release should occur exactly as $r$—$l$ reaches $t$, but hand release involves a slight time delay, hence the bomber should receive a visual signal for hand release slightly before $r$—$l$ reaches $t$, also, in dropping a series of bombs somewhat spaced in range it is often desired to drop the first one before $r$—$l$ reaches $t$, i. e., purposely short of the objective, and I provide means, illustrated in Figs. 18, 19, by which a signal lamp is lighted in advance of coincidence of the diminishing $\theta$ with the preset $\alpha$ for such a lead in hand release signal. Here is shown also, means by which motive-actuated release can be tripped automatically, either for a single bomb without any advance by motive release practically instantaneous, or, the first bomb of a series in advance. Referring to Fig. 18, 150 is an insulating block attached to arm $r$—$l$ and carrying three insulated electrical contactors 151, 152, 153, two of which are shown pivoted in the block and held by springs 154 in normal fixed positions against stop pins 155. Range arm $rt$ carries three contactors, 156, 157, 158, also insulated from each other, as by making the carrier block 159 of insulating material, these contacts being adjustable as by screwing in or out, to make contacts with their opposite contacts at variable angular differences between $\theta$ and $\alpha$. Thus, 158 may be adjusted to meet 153 as shown, when $\theta-\alpha=5°$; 157 to meet 152 when $\theta-\alpha=\frac{1}{2}°$; and 156 to meet 151 when $\theta=\alpha$. Fig. 19 shows an electrical circuit such that when contacts 158, 153, meet, a lamp, 160, in series with these contacts through battery 161 and closed main switch 163, is lighted as a warning signal when $\theta-\alpha=5°$ or less. As arm $r$—$l$ continues to move back, contactor arm 153, Fig. 18, is pushed by contact 158 against the slight contact pressure spring 154; contacts 157, 152 meet later, as when $\theta-\alpha=\frac{1}{2}°$, lighting lamp 162, Fig. 19, in series with these contacts and battery 161; contacts 156, 151 meet when $\theta=\alpha$, and with switch 164 in position shown, the circuit is closed through battery and a solenoid 165, representing any suitable electrical trip of a motive-actuated bomb release mechanism, so that automatic bomb release will thus occur when $\theta=\alpha$, as desired for instantaneous release of a single bomb. But by throwing switch 164 to dotted position, the automatic trip can be actuated earlier as when $\theta-\alpha=\frac{1}{2}°$, so as to drop the first bomb of a series purposely short of the objective. Lamp 162, in series with battery and contacts 152, 157, lights, thus providing the bomber an automatic signal to compensate for delay in hand release by such lead as $\theta-\alpha=\frac{1}{2}°$, for which these contacts may be adjusted.

Figure 17:
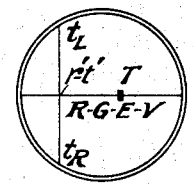
Fig. 17 illustrates an improvement in the use of a stabilized range reticule.
Figure 14:
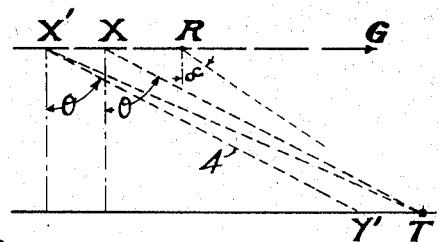
Fig. 14 is a diagram in side elevation of a vertical plane, showing further relations between the objective and the use of the sighting reticules.
Figure 33:
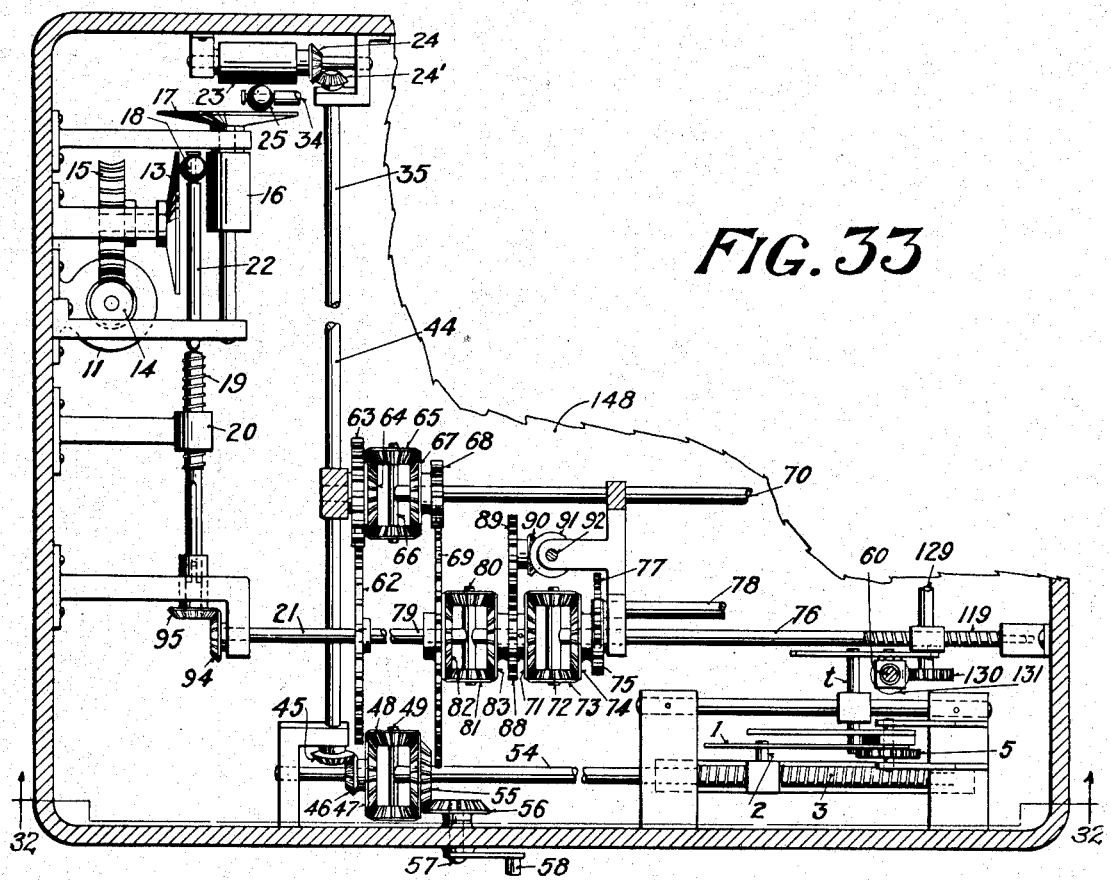
Fig. 33 is a plan view, sectionalized along 33—33, of Fig. 32.
Figure 32:
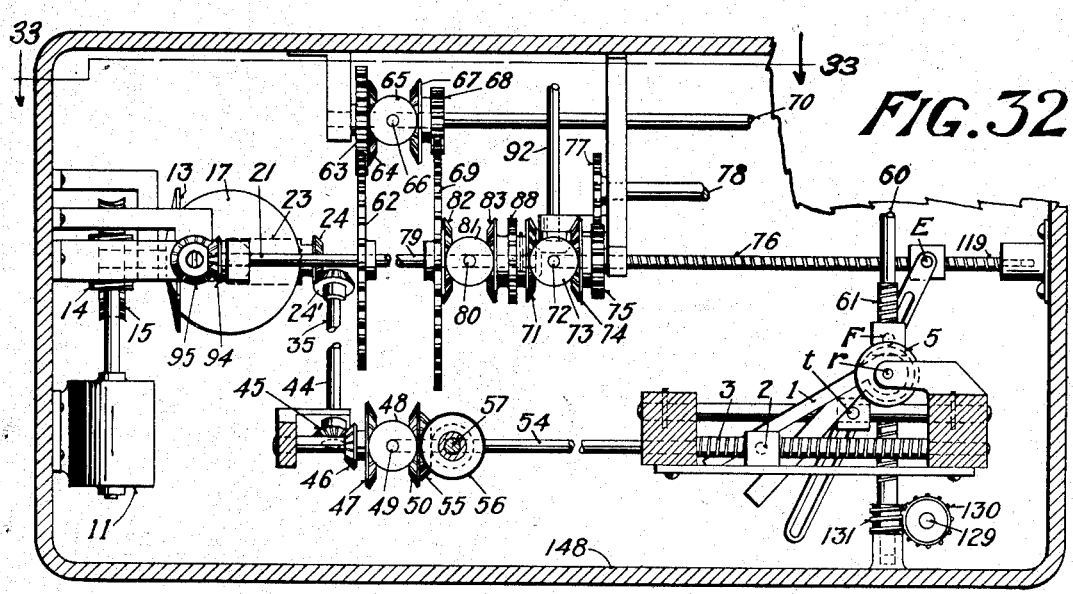
Fig. 32 is a side elevation, sectionalized along 32—32, Fig. 33, of all range mechanism shown diagrammatically in Fig. 8, except that of the correction unit, and of details which, for clarity, are separately shown in other figures.
Figure 34:
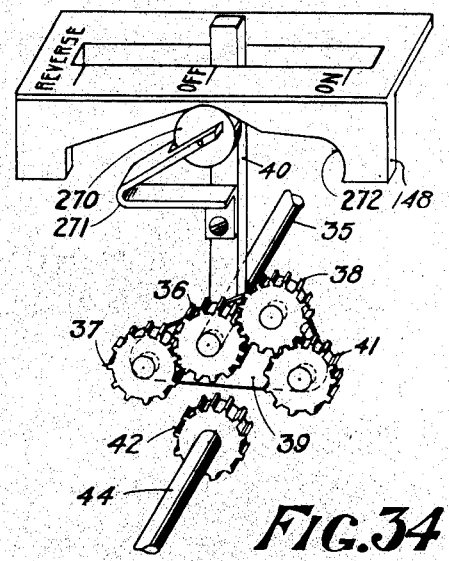
Fig. 34 is a perspective illustration of a tumbler gear shift, for transmission reversal.
Figure 37:
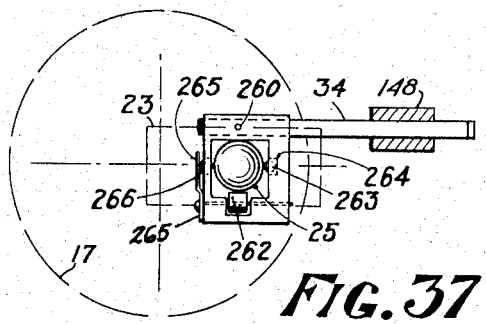
Fig. 37 is a plan view of the ball carrier of Fig. 36.

The function of contacts 158, 153, is to provide a signal 160 at a greater lead, as $\theta-\alpha=5°$, enabling the bomber to roughly synchronize the line of sight and preset $\alpha$, then to shift the pickup field of view, or $\theta$, to a lead which he knows is about 5°, permitting time to realign the course and re-synchronize accurately before $\theta=\alpha$, yet sufficiently close to $\alpha$ that an excessively long straight approach need not be held, i. e., the pilot may zig-zag the course as protection against anti-aircraft fire, until the objective reaches the cross-hair $t_L$—$t_R$, Fig. 17, corresponding to line of sight 4 at angle $\theta$, Fig. 14.

Figure 12:
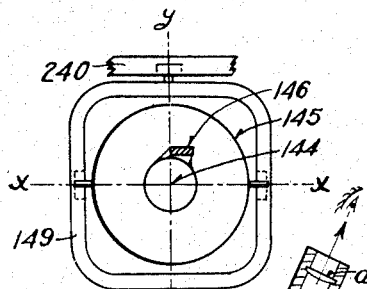
Fig. 12 is a plan view showing universal suspension of the gyroscope stabilizer of Fig. 11.

I will now describe novel features of improvement in gyroscopic stabilization to enable the fullest advantage to be taken of the precision of which the system is capable. The essentials of the optical system and combined gyroscopic stabilization of the reticule in the optical system have already been shown in Figs. 11 and 12 and are not separately novel, but I use them with novel improvements.

Figure 11:
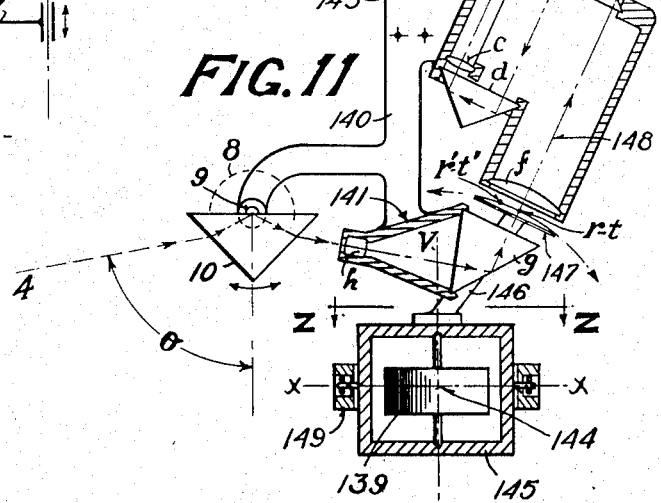
Fig. 11 is a sectionalized side elevation, showing the elements of the stabilized optical system.

In Fig. 11, mirror prism 10, and the attached gear 8, (Fig. 8), are together rotatable about the pin center 9 in a bracket 140 representing any suitable extension of the housings 141, 142 (shown in sectional view) carrying glass lenses $a, b, c, f, h$ and prisms $d, e, g$. The center of the field of view is represented by the dotted line 4 reflecting from mirror 10 through the lenses and prisms, along arrowed center line, as 168, to the eye position. Pivoted at the center 144 of the gyro suspension, is reticule 147 in a focal plane of the field of view, and this is seen from eye piece as two cross-lines, RGEV and $t_L$—$t_R$, (of Fig. 3). Reticule 147 is carried by a support 146 attached to the housing 145 of the gyroscope which is further illustrated in plan view, Fig. 12, taken along section Z—Z of Fig. 11.

The gyroscope comprises essentially a rotor 139 pivoted in housing 145 for rotation on the normally vertical axis V—V of the housing; the housing is pivoted to swing at right angles to axis V—V, on a normally horizontal axis $x$—$x$ in a gimbal ring or frame 149 which, in turn, is pivoted to swing on the normally horizontal axis $y$—$y$, at right angles to $x$—$x$ and to V—V, in a support 240, integral with the body of the instrument. The gyroscope is thus in "universal suspension" with respect to 144 intersection of pivotal axes $x$—$x$ and $y$—$y$, slightly above the center of gravity, i. e., slightly pendulous, so that its axis V—V seeks vertical by gravity, in freedom of swing about 144.

Axial center 9 of prism 10, and the series of lenses and prisms, and the gyro pivotal center 144 are in fixed relation, integral with the body of the instrument which, in turn, is fixed to the craft body. The assemblage, Fig. 11, bodily partakes of all oscillation of the carrier craft, except that, by virtue of the persistence of the gyro rotor to maintain its plane of rotation, the suspended gyroscope, i. e. axis V—V is stabilized in parallelism against rotation of the instrument about 144, so that the reticule is stabilized in position corresponding to concentricity of the reticule ring in the field of view, when the craft is in horizontal flight on an even keel, i. e., neither banking nor pitching and, when the gyro as a pendulum, has settled at rest, its axis V—V vertical. The reticule thus appears as in Fig. 3, where $r$—$t$ represents the center of the field through reticule. When the whole assemblage oscillates with the craft around gyro center 144, the gyro housing and attached reticule do not partake of such rotation, and while the field of view then shifts eccentric with the reticule ring as for a pitching of the craft as illustrated in Fig. 13, the reticule remains stabilized in relation to the ground or object T, the same as for no oscillation, Fig. 3, and T moves in visual relation to the reticule lines, only according to the craft's directional and/or range movements.

Figure 13:
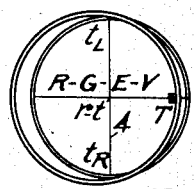
Fig. 13 illustrates from the bomber's eye view, relations between the stabilized reticule references, and the unstabilized field of view.

Figs. 3 and 13 represent the bomber's view of a ground object T, through the optical field, corresponding to Fig. 14 showing in side elevation, the craft X' at some distance back on the course RG, aligned in a vertical plane through T. Viewed through the reticule cross-line $t_L$—$t_R$ corresponds to view along line X'Y', Fig. 14, when mirror 10, Fig. 11, is tilted to an angle $\theta$, Fig. 14, and T is seen as in Fig. 13, ahead of $\theta$ or 4. As the craft passes from X' to X, the objective T appears to move in opposite direction, parallel to the craft's ground course X'G, i. e., from T, Fig. 13, to $t_L$—$t_R$ at which instant 4, Fig. 14, becomes XT. But if the course be to the left, as X'P, Fig. 2, and the directional reticule RGEV, Fig. 15, be in the direction of the ground course X'P, then T lies to the right of RGEV, and appears to move in the direction of the dotted arrow, parallel to the ground course X'P, and the position of T relative to RGEV shows to the bomber instantly that the ground course X'P must be turned to the right, by signalling the craft's pilot to turn the craft's heading to the right.

Figure 15:
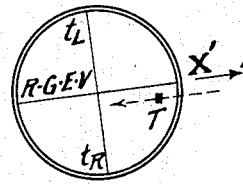
Figs. 15 and 16 illustrate relations between the stabilized directional reference reticule, and alignment of the craft's course in azimuth, relative to the objective.

The accomplishing of alignment of the ground course with reference to the objective, is not a simple matter of merely turning the craft and RGEV reticule with it in azimuth until RGEV intersects T, as in Fig. 15, because the ground course is the vector resultant of speed and direction of craft through the air, and of speed and direction of wind with reference to the ground, hence an angular change of craft axis heading in azimuth does not produce exactly the same angular change of the ground course, though for small turns nearly the same, and in subsequent description of my pilot-directing system I will show how I accomplish precise alignment, by inter-related turning of the directional plane of sighting RGEV, and signals to the pilot.

Figure 16:
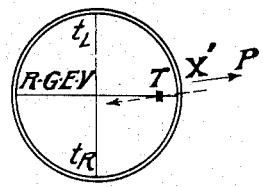

If RGEV directional plane, Fig. 15, be rotated in azimuth to intersect T as in Fig. 16, without changing the ground course X'P, T will continue to move parallel to the ground course X'P in direction of dotted arrow, back to the right off RGEV, hence until the ground course is aligned, the objective will appear to lie to, or move off toward, that side of the direction reticule in which the craft's course should be turned to effect alignment, whether the direction line be parallel to the craft's ground course as in Fig. 15, or, be turned to intersect the objective as in Fig. 16.

Figure 5:
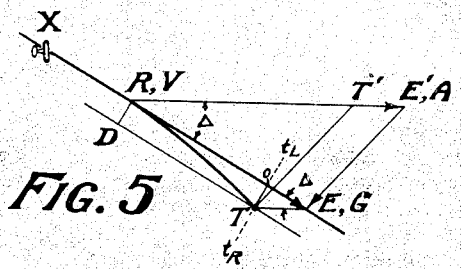
Fig. 5 is a plan view of Fig. 4.

Referring to Figs. 14 and 13, for a given angular position of mirror 10, movement of T toward the cross-line is directly proportional to the speed at which the craft is approaching T along X'X, and the time of movement of T from entering edge of the field back to field center is directly proportional to speed of approach and to the distance TY' subtended by half the field. The field should be as large as feasible so that at low altitudes and/or fast speeds, the time of T movement from entering the field, back to 4 or $t_L$—$t_R$ is sufficient to enable alignment of the course, i. e., T along RGEV, and to allow final correction of synchronization of $t_L$—$t_R$ upon T, i. e., while the craft passes from X to R, but 20° is about as large a field as is desired, to hold down the size of optical parts, and 10° or half the field available for alignment and resynchronization, may not allow enough time at low altitudes and/or fast speeds, without shifting the field back. But I provide an improvement allowing about 50% more time in the field without shifting it. Instead of locating cross reticule $t_L$—$t_R$ (Figs. 11, 13, 15, 16) across the field center as assumed in preceding descriptions, I locate it at $r'$—$t'$, Fig. 11, ahead of field center, as about one quarter of the field, as 5°, and since the optical system reverses the image, it appears that much back of field center as in Fig. 17. This change requires only that mirror 10 be meshed with pickup arm $r$—1, Fig. 8, in assembly, so that line of sight through $r'$—$t'$, Figs. 11, 17, instead of $r$—$t$, Figs. 11, 15, is the same as pickup arm $r$—1 angle $\theta$, with reference to $r$—$v$, Fig. 8. The direction line, or the field, back of $t_L$—$t_R$ is never used, but allows for craft oscillation or climb out of horizontal, opposite to a pitching as illustrated in Fig. 13, and 5°, Fig. 17, is more than an average oscillation in rough weather, hence $t_L$—$t_R$ will rarely ever disappear from view, and even then but momentarily. This device thus provides ample time to effect alignment and synchronization for extreme conditions, without shifting the field, i. e. time of passage over 15° or three quarters the field instead of 10° or only half the field, and mirror 10 may be preset back to an angle $\theta$ close to $\alpha$, at the beginning of an approach operation, with ample time to align T in its passage along RGEV over three-fourths of the field.

$t_L$—$t_R$, or XT, Fig. 14, should be set at an angle $\theta$ sufficiently larger than $\alpha$ to permit resynchronization on T before $\theta = \alpha$ (instant for bomb release), and the bomber does not know what $\alpha$ will be, before synchronizing and setting the range arm $r$—$t$, Fig. 8, at $\alpha$. But my system permits the bomber to pre-set $\alpha$ in two ways; approximately, by synchronizing $t_L$—$t_R$ on any ground object in line of approach; or without synchronizing, by presetting regulator 93 and dial 96, calibrated in up and down wind, to estimated wind, having pre-set 51 for altitude, and 136 for air speed. He may then merely drive 4 back to stop position of $r$—1 against $t$, where $\theta = \alpha$, by motive drive or hand cranking, then shift 4 ahead. The signal lamp 160, Fig. 19, shows where $\theta$ leads $\alpha$ by a predetermined angle.

It will now be seen that I have designed the system for very flexible use, allowing optional procedures, according to varying circumstances, as I may prefer.

At high altitudes where there is relatively little danger from anti-aircraft in a long straight approach, the bomber may shift $\theta$ anywhere ahead toward horizon and align the course by the azimuth relation of objective T to the directional reticule; synchronize $t_L$—$t_R$ relative to T and thus pre-set $\alpha$ range arm; shift $\theta$ to a lead ahead of $\alpha$, indicated by an automatic signal, and allow the pilot to zig-zag the course until T approaches the cross reticule, then realign and re-synchronize accurately till hand release signal or automatic release occurs as described for Fig. 19.

Or, the bomber, after roughly aligning on T far ahead, may synchronize $t_L$—$t_R$, on any object intersecting $t_L$—$t_R$ at any angle $\theta$ ahead of $\alpha$; disconnect the drive, and wait till T intersects $t_L$—$t_R$, as cranked back to the range angle then release the bomb.

If the bomber sees but one chance to view the objective, and that clouds will obscure the objective upon closer approach, he may align and synchronize accurately upon the objective, leaving the drive connected, and the instant for release at range angle $\alpha$ will be indicated or, the bombs be automatically released when $\theta=\alpha$, with only the error which may be due to change in speed of approach after last synchronizing.

The setting of $r$—$t$ range arm at the range angle $\alpha$, prescribes presetting altitude scale 51, Fig. 8; air speed scale 136; and type of bomb scale 127; then establishing synchronization of line of sight 4, through cross reticule $t_L$—$t_R$, Fig. 17, relatively to object T. The process of synchronizing line of sight 4 relative to the approaching object T, prescribes presetting of altitude scale 51, connection of motive drive "on", and, adjusting regulator 93. It will be noted that having preset altitude, air speed and type of bomb, then range arm $rt$ does not change its setting after synchronization, and that line of sight 4 continues to move at the synchronized rate without the need of any further manual or visual attention except to correct both $\alpha$ and the rate of movement of 4 in case the speed of approach changes thereafter, or to reset for less likely change of air speed or altitude and some time before the line to target would reach $r$—$t$, to crank the mirror for cross-line-target intersection. The bomber may change any setting during the approach in accord with change of the variables, hence in addition to zig-zagging of the course to elude anti-aircraft until final realignment and re-synchronization, the pilot may also change the altitude of level flight, allowing the bomber a few seconds after the warning lead signal, to reset for altitude and re-synchronize for a slight change of $\alpha$ and the synchronous rate.

The essentials of the foregoing described optical system using a stabilized recticule are not novel but I will describe improvements which I have effected in the application of this stabilized optical system, which are of practical advantage in overcoming difficulties heretofore encountered by the bomber in the use of it.

Stabilization of the line of sight 4, Fig. 11, against partaking of oscillations of the craft about gyro pivotal center 144, is not affected by rotation of the optical assemblage about this center, but the angle at which a ground object is viewed along 4, or the cross reticule $t_L$—$t_R$, Fig. 17, with respect to true vertical, is only equal to $\theta$ between pickup arm $r$—1 (Fig. 8) and instrument axis $r$—$v$, when the gyro axis V—V, (Fig. 11), has settled to vertical, hence the latter must be vertical before accurate alignment and synchronization with reference to the reticules. Now, in such application, the gyroscope must purposely be made to have a long period of oscillation as of the order of 20 seconds or more, so as to be practically immune from precession out of vertical, by accelerations or decelerations, and its correspondingly long period of swinging into true vertical, from a position considerably out of vertical, would require too long an approach to wait until V—V is vertical. Thus, it is necessary that the instrument axis $v$—$v$, Fig. 24, to which V—V is at first caged in coincidence, be close to vertical when the gyroscope housing is uncaged and rendered pivotally free. Heretofore, the procedure has depended upon attempting to level the craft and instrument by level indicators, and manually uncaging the gyroscope in a position of the craft indicating $v$—$v$ to be level, but it is practically impossible for a pilot to level an aircraft, or to hold it level, for this critical operation, within an average of much less than two degrees and more of error, according to the roughness of the air, and I provide improved means by which the gyroscope is automatically uncaged when V—V is close to vertical, independent of the position or oscillations of the craft.

This device comprises any suitable mechanism such as illustrated in Figs. 23, 24, or 25, for caging and uncaging the gyroscope housing 145 or pin extension 175, i. e., of caging gyro axis V—V parallel to the normally vertical axis $v$—$v$ of the instrument and releasing V—V pivotally free of the instrument, but also comprises universal suspension of the instrument in the craft body, with means for tilting the instrument in reference to the craft, thus permitting the bomber to level the instrument corresponding to $v$—$v$ vertical, independent of the attitude of the craft, by reading an ordinary bubble level so mounted upon the instrument as to read zero when $v$—$v$ is vertical, and, a special level detector device illustrated in Figs. 20 and 21, or 22, more accurate than the ordinary bubble level, and automatically actuating the uncaging of the gyro housing 145 in caged coincidence of V—V with $v$—$v$.

Figs. 23, 24, show plan and side elevation illustrations of such a caging mechanism, the universal suspension of the gyroscope housing 145 already shown in Fig. 11, being here omitted. Gyro suspension pivotal center 144, Fig. 11, about which the housing 145 can, when uncaged, swing in any direction, may in Figs. 23, 24, be considered as on the axis of hinge 170, about which caging arms 171, 172, are pivoted. These arms carry extensions 173, 174, in the form of jaws, shown separated (plan view Fig. 23) so that pin extension 175 of the gyro housing 145 is free to swing in any direction unobstructed for such as 10°, or more than the craft's oscillations out of level during a bombing approach. Spring 180 normally holds the jaws closed and pin 175 caged on instrument axis $v$—$v$, but the jaws are forced apart, as shown, by energizing solenoid 164, pulling down plunger 176 and, through link 177, forcing one end of arm 178, pivoted at 240 support, up against a toggle joint 179. When solenoid 164 is deenergized, spring 180 cages the axis V—V with $v$—$v$, by overlapping of the jaws 174 and 173.

In Fig. 25, wiring diagram, a cone type of caging device is shown performing the same functions, spring 180 bearing against plunger flange 181 and forcing plunger cone 176 to cage housing 145 pin; and the energizing of solenoid 164 pulling cone 176 free of the pin 175.

The level detector device which was issued into Patent No. 1,955,746 April 24, 1934, comprises two or more members, displaceable from normal positions corresponding to level attitude of their support, by tilt of the instrument out of level position; the members having different periods of displacement and return for a given tilt or acceleration, and actuating the uncage solenoid 164 only when the support is substantially in level position. Fig.

20 is a plan view of Fig. 21, showing a ball level form of this device.

In Fig. 21, a and b represent two or more ball level units acting with respect to tilt of the support 148 in a given direction; c and d, a similar set acting likewise with respect to tilt in component direction at right angles to that of the first set. Fig. 21, b and c, are cross sections along Z—Z of Fig. 20. In all units, 190 is an electrically conducting ball, rolling in a concave race 191, its motions damped by surrounding fluid 192, all encased in a case 193 as of glass, and all units mounted upon a support 148 integral with the body of the instrument to be levelled, so that neutral positions of the balls correspond to vertical position of the instrument axis v—v without acceleration. The race 191 of any suitable section as shown in Fig. 21, b and c, comprises two contacts 194, one on each side of the race, insulated from each other, as embedded in insulating material which the rest of the race may be made, so that the contacts constitute a small neutral arc, as ½°, within which the ball effects electrical connection between the two contacts. These contacts of all units are wired in series as shown in Fig. 20, so that the circuit through the ball races from e to f is open if any one ball is off neutral, and is completed only when all balls are on neutrals.

Now, the only difference between a and b, or between c and d, need be that the periods of oscillation of the balls in each parallel set of two (or more) units, are made to be different, for a given acceleration or tilt imparted to all alike and throwing them off neutral. This may be accomplished by different sized balls in same viscosity damping fluid, or same sized balls in fluids of different viscosities, or different race curvatures or, by combinations. Evidently a given tilt of a and b units which would roll the balls off neutrals might be accompanied by a specific acceleration which would exactly counteract the force of displacement, such as a perfectly banked turn of the carrier craft, and leave the balls at neutrals in a tilt, but such a coincidence is not likely, and furthermore, the pilot in following the pilot director during the bombing approach, is prevented from making normally banked turns, hence such a coincidence is only a remote possibility. The simultaneous centering of all balls of the series, in a tilt, is rendered more remote by the time differences in their cycles of displacement for the same tilt or accelerations. Thus, the bomber, in levelling the instrument body, 148, Fig. 20, to an ordinary spirit level of no great precision, mounted upon the instrument, must pass the axis v—v close enough to vertical that the series circuit, Fig. 20, is completed, which actuates the uncaging of the gyroscope and within greater precision than by manual uncaging on inaccurate indications of the usual level indicators, also the automatic action is devoid of such variable time delay as frequently occurs in manual operation; which may result in uncaging when v—v, and hence V—V, Fig. 24, is considerably out of vertical.

Instead of two sets of one-direction levels at right angles to each other, may be substituted two or more spherical races, each with different periods of ball displacement, applying to tilt in any direction or, another form shown in Fig. 22 of applying the same principle.

In Fig. 22, 200 and 201 represent two pendulums of different periods, universally suspended in ball sockets and making contacts with 202 and 203, center spring contacts, only when the support box axis v—v is vertical and at rest. The box may be filled with damping fluid not here indicated. Thus, the electrical circuit e to f through the contacts 202 and 203 is completed when v—v is vertical.

The wiring diagram, Fig. 25, shows the operation of the level detector device, here represented diagrammatically as 205. Tracing only the operation of the level detector 205, it will be seen that its terminals e and f are connected in series with battery 161 through a main switch 163, and through a relay 206, through the closed contacts 207, 211. Thus, when the whole instrument is levelled, and free from jolting, the closing of the level detector circuit e to f automatically energizes relay 206, pulling down the hinged armature 208, which forces contact 209 against 210 and, by a slight further movement of 209 and 210 together, bending the spring arm, separates contact 207 from connection with 211, thus breaking the detector circuit. But the first contacting of 209 and 210 by-passes the relay energizing current through the relay, without going through detector 206, thus holding the relay 206 energized when the subsequent breaking of the contacts between 207 and 211 breaks the circuit through level detector. Thus, once the level detector circuit is completed upon levelling the instrument, the relay 206 remains energized, whether the detector balls roll off neutrals or not thereafter, and, there is no arcing current across the detector ball contacts. The simultaneous closing of 212 with 213 connects battery 161 in series with the uncaging solenoid 164, through the main switch 163 and a pair of contacts at 214, normally held closed by spring pressure of contact arm 214. The function of this pair of contacts is merely auxiliary, to introduce resistance 215 into the solenoid 164 circuit, when the plunger is at the end of the uncaging stroke, thus reducing the current to the lesser amount which is needed to hold it there. Thus, at end of the uncaging stroke, plunger flange 181 strikes 214 leaf spring, opens the contacts, and so by-passes the solenoid circuit through resistance 215.

The gyro housing 145, or pin 175, Fig. 24, remains uncaged until solenoid 164 energizing current is cut off, by opening main switch 163, when spring 180 then effects the caging of the gyro axis V—V with instrument axis v—v.

In Fig. 25, 216 is a lamp which is connected across the battery through the closed contacts at 217, as soon as the main switch 163 is thrown "on". This signal calls the bomber's attention immediately to the first operation of levelling the instrument and uncaging the gyro axis V—V in vertical position, which is essential before the reticules constitute stabilized references. Spring arm 217, normally holding the contacts closed, is struck by plunger flange 181, upon uncaging, thus breaking the lamp circuit, as a signal to the bomber that the gyro is uncaged and no further attention to levelling the instrument is needed.

Figs. 26 and 27 show side and plan views respectively, of an additional device, applicable to other apparatus utilizing gyroscopes. Gyroscopic stabilization in parallelism, of a reference axis, as V—V, Fig. 11, prescribes that the instrument shall be free to rotate relative to the gyro center of suspension without obstructing any part of the suspended gyroscope, as any pressure on the gyroscope housing upsets V—V out of vertical. When the stabilized reticules are not in use, however, the craft will tilt in excess of oscillations normal in the bombing approach, as in climbing to altitude, or banking about or in diving to land, and the gyro should then be caged to prevent bumping of the instrument body against it, causing pivotal wear and tear. Also, to save current, the battery should be switched off. But the bomber frequently forgets to open the battery switch, hence I provide a device to relieve him of these concerns and to automatically cage the gyro and cut off all current used by the instrument.

The device may comprise two or more limit stop members as 220, 221, 222, each pivoted like 220, as at 224 in the support 240. These members are normally positioned by springs 228 holding them against pins 229, and are of such form as to allow tilt, as 10°, without obstruction of gyro housing pin 175, for maximum oscillations of the craft during the use of the stabilization in the bombing approach, but constituting bumper limits when excess tilting in whatever direction forces one or the other arms against gyro pin 175 and so connects one arm contact, as 226, with a support contact, 227, as in climbing, landing, or maneuvering of the craft. The multiple pairs of such contacts are electrically connected in parallel, the arms here being considered as electrically grounded to one side of the battery. Thus, whenever the craft is maneuvered before or after the bombing approach, gyro pin 175 momentarily strikes this bumper limit and, as represented diagrammatically in Fig. 25, one pair of contacts connect 226, 227, and this energizes solenoid 230 in series with the battery 161 and main switch 163. Plunger 231, (Fig. 25) constitutes a catch, snapped by spring 232 under switch lug 234 to hold the switch in "on" position, until the energizing of solenoid 230 by bumper contacts pulls it clear, when switch 163 is automatically opened by spring 233. Thus, when the bombsight is not in use, all current will soon be shut off automatically, and both the reticule stabilizer gyro and the pilot director gyro will be spring caged. Upon again preparing for a bombing approach, the bomber merely closes the main switch 163, Fig. 25, and proceeds to level the instrument until the detector 205 actuates the gyro uncaging, and lamp 216 so indicates, by going out.

Figs. 28, 29, 30, 31, illustrate two features which insure against damage to the reticule 147 (also Fig. 11) where its removal, together with the gyroscope housing 145 in direction of V—V, with its suspension support as a unit assembled in a case 240, Fig. 29, or, the insertion of this unit back into the instrument body 148, requires bracket 141 (Fig. 11) with prism g (see also Figs. 28, 29) to be moved aside out of the way of the reticule 147. Fig. 29 is a side elevation of the instrument, showing only the parts relevant to the safety device, gyro unit case 240 assembled in place, and part of the door 241 cut away to show the reticule 147 as assembled to swing above the prism g, about gyro center of suspension 144 in the removable case 240. Fig. 28 is a plan view sectionalized along Z—Z, Fig. 29, and shows the prism g and bracket 141 mounted on the door 241, which is hinged at 242 to swing the prism g out from under the reticule 147 when the door is opened. In Fig. 29, the bracket 141 is omitted but the prism g is shown in its mounted relation to the door. Both views show an arm 243, bearing against the door 241 by spring 244 pull, and pivoted in a lug extension 245 of the instrument body. The arm 243 is integral with shaft 246 and with cam or lug 247 so disposed that when the door is closed as shown, the lug 247 projects into the path, parallel to v—v, of lug 248 attached to the gyro unit case 240 so that the case cannot be pushed up into the instrument body far enough to strike reticule 147 against the bottom of prism g; but when door is opened to clear the prism of the reticule, rotation of arm 243 rotates lug 247 clear of lug 248, permitting insertion of the gyro unit case 240 where it is locked by device shown in Fig. 31.

Fig. 31 is a cross section of the gyro unit case 240 of Fig. 29 and part of the instrument case 148 into which it fits, but showing lug 248 (Fig. 29) as an extension of a spring leaf 249 riveted to the case 240 and capable of being sprung inward by pushing button 257 attached to it and extending through the case 240. When the case is pushed up into the instrument as shown, a pin 258 attached to spring leaf 249 is snapped into a notch in 148 and holds the case 240 in position, and pin 258 cannot be released if door 241, Fig. 28, is closed, as the aforedescribed lug 247 is then in position to prevent spring 249 being pushed inward by button 257. Thus, the gyro unit cannot be withdrawn until the prism g, Fig. 29, is cleared of the reticule 147 by opening door 241.

Fig. 30, a perspective view of the instrument from the end opposite the door hinge, shows another safety device in the form of a combined door catch and electric switch, somewhat exaggerated in size relative to the instrument, and more suitably built on the inside of the box instead of outside as illustrated. This comprises any suitable door catch, as arm 250 pivoted at 251 to the instrument and normally held in position shown against stop pin 252 by spring 253; and a catch 254 fixed to the door 241, so that closing the door snaps the lower catch past the upper catch and back into locked position shown. Both catches may be electrically insulated from their pivoted and fixed attachments to the instrument body and door, so as to constitute an electric switch connecting terminals 255, 256, when the door is closed, and opening the circuit when the door is opened. This switch, not shown in Fig. 25, wiring diagram, is connected in series with the battery 161 and main switch 163. Thus, since the preceding device requires the door to be opened in order to remove or insert the gyro unit, the door catch switch must also be opened, insuring that the gyro is caged, hence the reticule 147, Fig. 28, cannot be in a tilt so as to overlap any part of the instrument in withdrawing the gyro unit from the instrument, or inserting it.

In previous description of the synchronizing process it was seen that the bomb's trail (ET, Fig. 1) is parallel to the craft's heading through the air. In case of cross wind approach (Figs. 4, 5) the craft's course RG should be aligned to one side of the target T by the offset OT which is the directional component of the trail. This correction may be accomplished by tilting the directional plane of sighting RGEV out of vertical by an angle θ which subtends the offset OT. When that correction is made the plane of sighting becomes RTD, Fig. 4, i. e., not strictly vertical, but since the process of alignment is in no way changed by introducing such correction, we may, for clarity, ignore it in here describing the method of alignment, assuming the plane of sighting S (Figs. 40, 42) to be vertical and, that the bomb trajectory lies in the vertical plane of the craft's ground track, G15.

Figure 40:
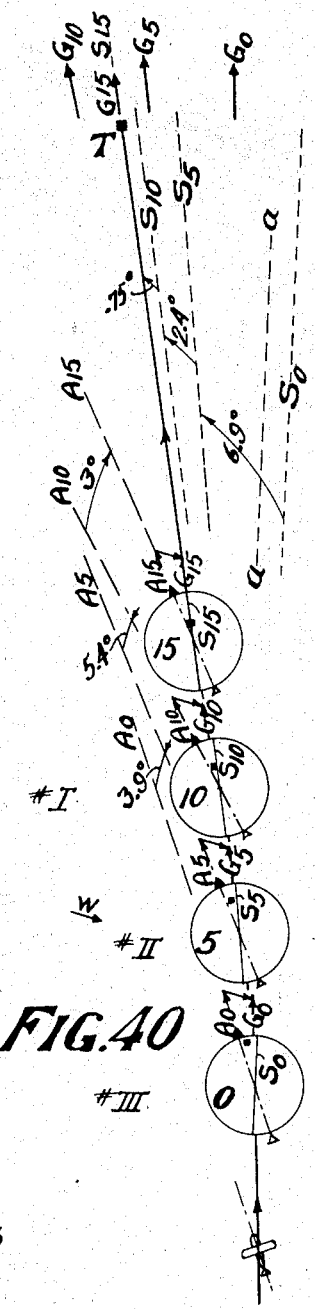
Fig. 40 is a plan diagram showing how the course of an aircraft is aligned on a stationary bombing objective by the pilot directing system.
Figure 41:
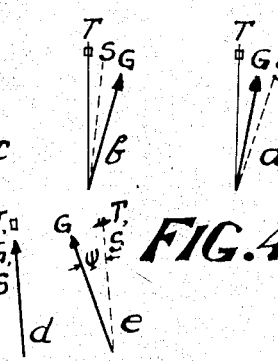
Fig. 41 illustrates the three cases of directional misalignment for which the pilot directing system is selectively adapted; also alignment relations to fixed and moving targets.

In approaching a stationary objective (Fig. 40) alignment, Fig. 41, d, must change the craft's heading through the air until the vector resultant ground course G, intersects target.

In the case of a moving target (Fig. 42) it is obvious that while the bomb is falling, as from point of release R to T35, corresponding to R—T, Fig. 4, the moving objective travels a "lead", as T$_R$—T$_{35}$, which is equal to a product of the target's speed multiplied by the bomb's time of fall, hence in order to hit the moving target, the craft's course at point of bomb release R, must be aligned not to intersect the target at T$_R$, but the unknown lead point at which the bomb and target will meet.

It is practically impossible in flight for the bomber or pilot to estimate within large errors the target's speed, the bomb's falling time, to calculate the resulting lead T$_R$—T$_{35}$, or to locate the point T$_{35}$, but the process of alignment automatically orients the craft's course on this unknown point, without estimation, and involving only observation of the moving target and displacing a single manual control from a neutral position, always in direction corresponding to that in which the target lies to right or left of the directional reticule S (Fig. 42), the process being the same whether the target is moving or, as in Fig. 40, fixed.

The system of alignment comprises a pilot's instrument (Figs. 44 to 47 inc.) mounted on the craft body; a directional plane of sighting S (Fig. 40, 42) rotatable in azimuth relative to the craft, (corresponding to reticule RGEV of the optical system previously described, Figs. 3, 11, 13 to 17 inc.); a bomber's control (Figs. 43 and 48 to 50 inc.) actuating, in interconnected ratios, motive rotation of the sighting plane S and of the pilot director signal pointer 281 (Fig. 46), the latter constituting an index with respect to which a gyroscopically stabilized pointer 280 registers.

Figure 45:
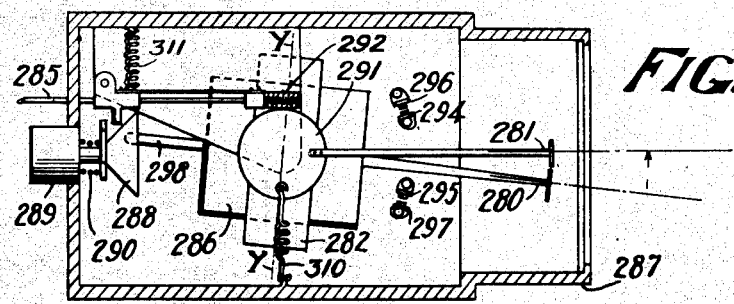
Figs. 44, 45, 46, are respectively left side elevation, plan view and face view of the pilot's indicating instrument.
Figure 44:
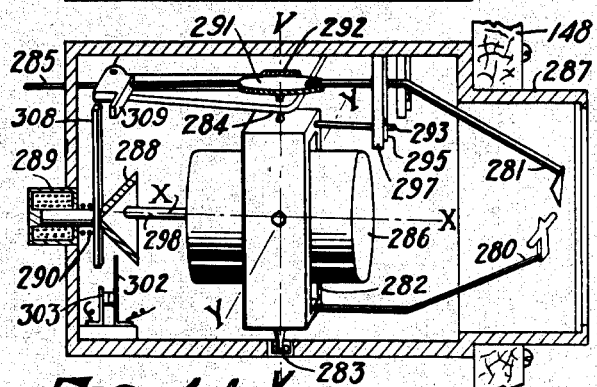
Figure 46:
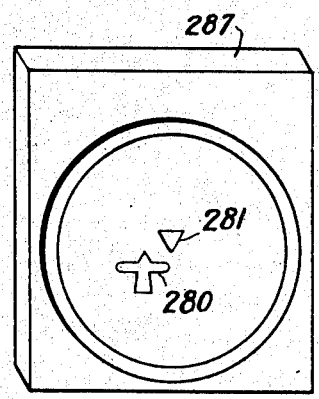

Referring to Figs. 44 and 47, 280 and 281 are two pointers registering relatively in azimuth, movable about a normally vertical axis V—V of the instrument case 287. Pointer 280 is fixed to a gimbal ring 282 pivoted on a vertical axis in the case bearings 283, 284. In this ring, on lateral axis Y—Y perpendicular to V—V, is pivoted the gyroscope housing 286 in which the gyroscope rotor not here shown, revolves on axis X—X at right angles to Y—Y and normally horizontal. This relation of the three axes constitutes well known "universal suspension" of a gyroscope, but unlike that of the reticle stabilizer gyroscope, which is pendular and "vertical seeking", I make the pilot director gyroscope "neutral", i. e., the three axes intersect the center of gravity of the gyro housing assembly so that rolling, pitching and accelerations of the craft have no tendency to move axis X—X out of parallelism with whatever direction it may have when released from the case. The rotor may constitute the armature and fly wheel of an electric motor. It will be seen that when the axis X—X is free, as shown in Fig. 44, i. e., the pin 298 extension of the housing 286 is not caged with respect to the case 287, then any rotation of the craft about axis Y—Y, as in pitching or climbing, rotates the whole instrument assembly about Y—Y, with the exception of the housing 286 and no relative movement is caused between pointers 280, 281; but any turn of the craft in azimuth, about axis V—V, rotates the assembly including pointer 281, while the gyroscopic stabilization of axis X—X holds the gimbal 282 and attached pointer 280 from rotating, hence pointer 281 moves with reference to pointer 280 exactly corresponding to the degree of turn of the craft in azimuth only. Figs. 45, 46 illustrate relative movement of the pointer 281 in a craft turn to the left as 6°.

Unless solenoid 289 be energized to pull the plunger of which the cone is a part, into uncaged position as shown, axis X—X is caged in line with the fore and aft axis of the instrument through center of cone 288, by spring 290 which pushes the cone against pin 298. The pointer 281, which always constitutes the pilot's index to which he holds pointer 280, by ruddering the craft, is attached to worm wheel 291, and is displaceable in azimuth relation to the case, by worm 292, and its shaft, 285.

Figure 47:
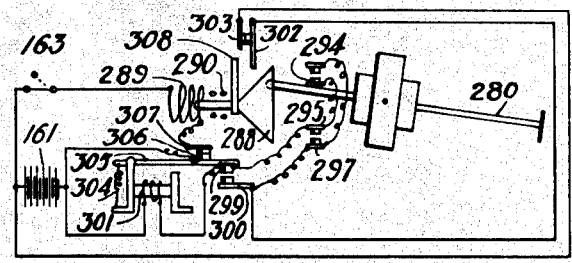
Fig. 47 is a wiring diagram of the pilot director.

Worm 292 is meshed with pointer worm wheel 291 so long as cone 288 is held free of pin 298, until either pointer moves to right or left of instrument center, through some limiting arc such as 15°, where the pointer pushes one of the pair of limit contacts 294, 296 or 295, 297, causing automatic centering of both pointers. Wiring diagram Fig. 47, shows how this may be accomplished. The limit contacts are electrically connected in parallel with contacts 299, 300, and in series with a relay, 301, battery 161, and contacts 302, 303. Spring 304 normally holds armature 305 in position shown, in which contacts 299 and 300 are open, and contacts 306, 307 are closed. The latter complete the circuit through the uncaging solenoid 289 in series with battery 161, and the energized solenoid holds cone 288 free of pin 298 as shown in Figs. 44, 45. But whenever either pointer 280, 281 closes either pair of contacts at limiting swing, relay 301 is energized, pulling armature 305 to break contacts 306, 307, thus deenergizing solenoid 289 allowing spring 290 to cage axis X—X, Fig. 44, in fixture with the case, and centering pointer 280; while lug 308, at the end of the caging stroke, forces lug 309 (Fig. 44) of the worm bearing assembly, to force worm 292 out of mesh with worm wheel 291, allowing spring 310 (Fig. 45) to center the pointer 281.

The bumper contacts will be opened at the beginning of the caging stroke, hence to hold the relay armature 305 in open position of contacts 306, 307 until the caging is completed, the relay circuit by-passes through contacts 299, 300 as soon as they close, and the armature remains in position of open contacts 306, 307 until the end of the caging stroke, when cone lug 308 forces contacts 302, 303 apart, breaking the relay energizing circuit and allowing spring 304 to force armature 305 up to again close contacts 306, 307 and re-energize solenoid 289, causing uncaging of the gyro pointer 280; and also allowing spring 311, (Fig. 45) again to mesh worm 292 with worm wheel 291. Thus any motive displacing of pointer 281 in accord with the bomber's control manipulation, and any registering of craft turning of 281 relative to 280, are interrupted but momentarily, only in case either pointer may depart from instrument center by the limiting arc. If, as in cases of approach illustrated in Figs. 40, 42, the entire alignment is done without exceeding such a limiting turn of craft axis A, or rotation of sight S, then this centering action will not occur.

A working embodiment of the bomber's control is illustrated in Figs. 43, 48 to 50 inclusive, comprising essentially a manual control lever 75

Figure 43:
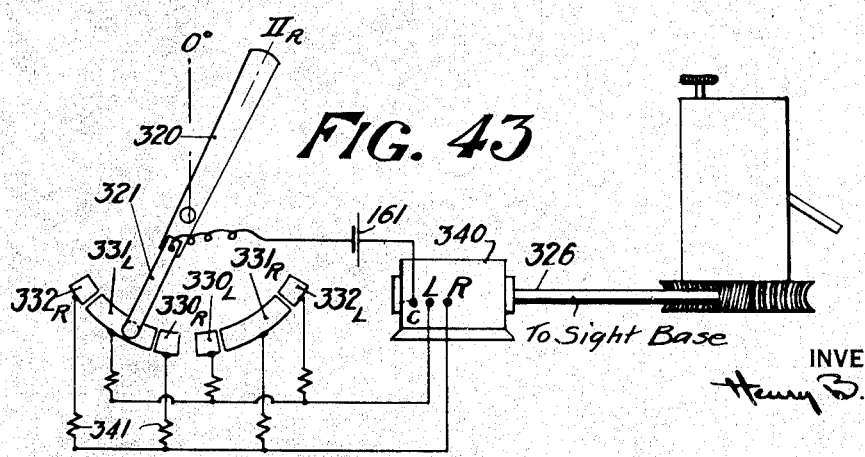
Fig. 43 is a wiring diagram of the electrical part of the directional control.

320, displaceable right and left of a neutral position marked 0° (Fig. 48) actuating a device to change the relative speeds and directions of rotation by motive drive, of the directional plane of sighting and of pointer 281 displacement in three selective combinations. The means illustrated comprises a simple commutator and contact brush, wired as shown in Fig. 43, for changing the direction of rotation of a reversible motor 340; and a set of tumbler gears as shown in Figs. 48 to 50, for changing the ratio between shaft 326, 327 connected respectively as by flexible shaft drive to motor 340 to rotate the sight and shaft 285 of the pilot director (Fig. 45).

Fig. 49 is a left side view of the assembled control in which 148' represents in section, a suitable frame attached to the craft body or for convenience of manipulation, to the bomb-sight instrument. Fig. 48 is a face view of Fig. 49, omitting, for clarity, frame 148 and all but #III cam and tumbler gear train.

Fig. 50 shows the three tumbler gear and cam combinations, for clarity separated, but corresponding to like numeraled parts of Fig. 49 side view.

Cams 323, 324, 325, commutator brush 321 hub, and control lever 329, are all fixed to shaft 328 and the cam notches are designed to push the rollers of the tumbler gear carrying arms 333, 334, 335, so that only one gear combination I, II or III is meshed at a time between shafts 326, 327, which corresponds to I, II or III control positions.

If the control be centered at 0°, all the cam axes marked 0° rotate to the 60° lines at the rollers, throwing combinations II and III out of mesh. It is not necessary to throw combination I out of mesh as brush 321 is then on the insulated neutral arc 329 and the motor drive of gear S is stopped.

The operation of the system will be clear by considering the gear S, shaft 326 (Fig. 48) as driven through any suitable connection by the motor 340 (Fig. 43) which also rotates the directional plane of sighting; and shaft 327 to be connected by any suitable means as flexible shafting, to shaft 285 (Fig. 45). Thus if the gear ratio between shafts 326, 327 were one to one, the signal pointer 281 would be motive deflected the same degree as rotation of the sight. But the three control positions selectively mesh three different ratios between 326 and 327, corresponding to the direction of sight rotation or of gear S, controlled by the commutator.

Thus, if the control be pushed to position III to the right as in Fig. 48, the brush is on commutator segment 332ʀ (Fig. 43) connecting motor 340 to drive gear S in arrow direction corresponding to rotation of the sight to the right, corresponding to control push to the right and concurrently meshing gear train III, driving gear A; shaft 327, in arrow direction, corresponding to deflection of pointer 281, also to the right, but at a somewhat faster rate than sight rotation. Assuming that the motor be designed to rotate the sight at 1° per second and gear ratio III to rotate the pointer at 1⅓° per second, then if the bomber holds control position III for one second, the pilot in holding pointer 281 into coincidence with pointer 280, will turn the craft axis 1⅓° while the sight is rotated 1° to the right relative to the craft body, but 2⅓° (=1 plus 1⅓) to the right relative to the ground.

The gear ratios and relative directions of rotation chosen for combinations II and I are tabulated herewith.

| Control position, right or left | Neutral | I | II | III |
|---|---|---|---|---|
| Azimuth sequence, Fig. 41 | | c | b | a |
| Motive rotation of direction reticule relative to the craft | 0 | 1°/sec. + | 1°/sec. − | 1°/sec. + |
| Motive rotation of index pointer 281 | 0 | .8°/sec. − | 1.8°/sec. + | 1.3°/sec. + |
| Rotation of direction reticule relative to ground | 0 | .2°/sec. + | .8°/sec. + | 2.3°/sec. + |

Positive sign signifies motive rotation in direction corresponding to that of control displacement from neutral, negative sign, counter.

Figure 42:
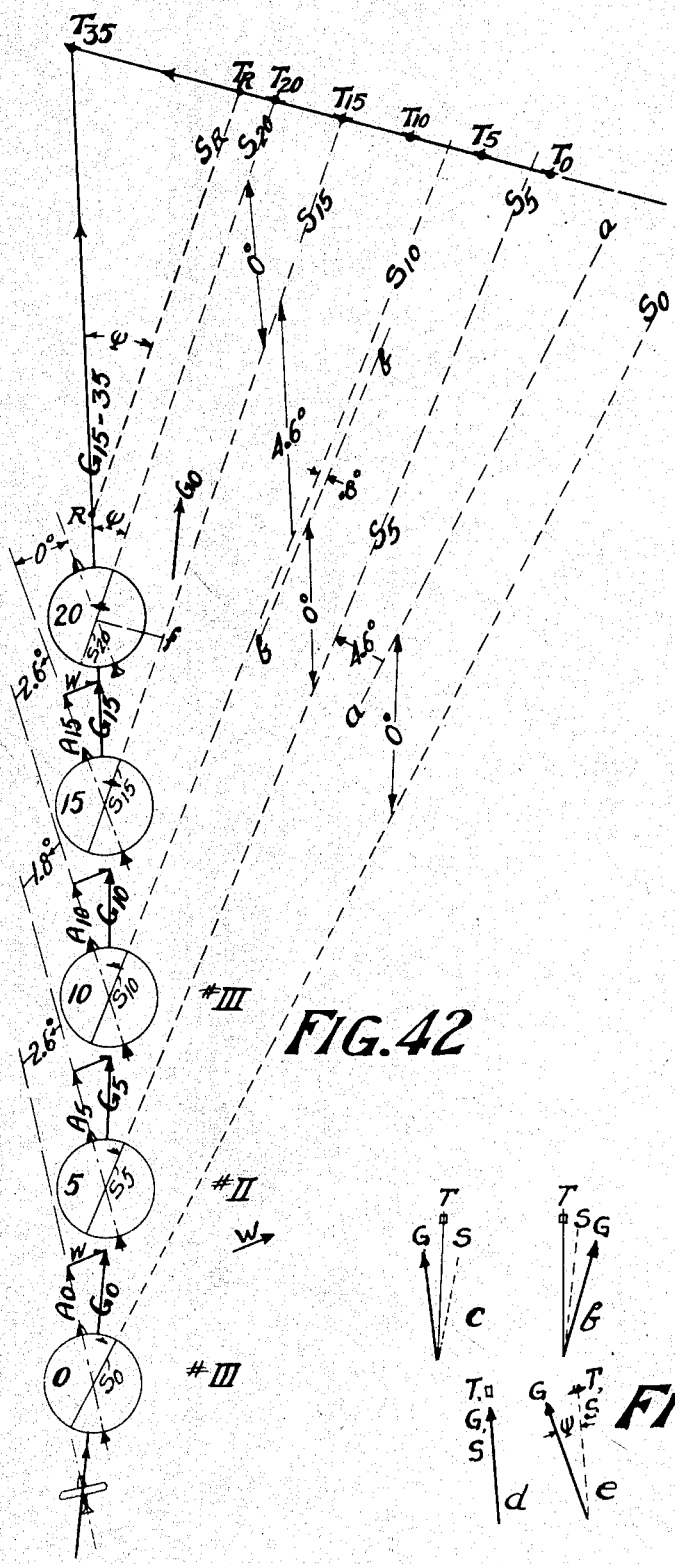
Fig. 42 illustrates how the pilot directing system applies to alignment on a moving objective.

Resistances 341 (Fig. 43) may be used if it is desired to vary the rate of motive drive for the three combinations, but a rate of 1° per second is assumed for all three in the following explanation of the operation of the system, referring to plan diagrams (Figs. 40, 41, 42). The ratios above assumed are arbitrarily chosen, as meeting average conditions, but exact values are unimportant, as alignment is accomplished by effecting turns of the craft definitely related to the degree of azimuth rotation of the sight. Combinations I, II, III of relative directions and relative rates, will be seen to correspond to the three and only possible three combinations (a, b, c, Fig. 41) of sequence in azimuth of the vertical plane of sighting S, the line to the target T, and the vertical plane of the craft's course G.

In case c, namely, sight S to the right of the target T, and craft's course G to the left, the course must be turned to the right while the sight is turned to the left for both to intersect the target, and though there are unlimited combinations of angles, each requiring a different ratio to effect such alignment in a single continuous turn, alignment is accomplished by repeated steps using for each selective control position a single arbitrary ratio in general accord with the respective cases c, b, a.

In case (b) sequence, the course G will be turned nearer alignment, and also the sight, by turning the craft to the left somewhat more than the sight is turned toward the left and I make control position II fit this case by rotating the sight relative to the craft somewhat slower than, and counter to, the turn signal pointer deflection.

In case (a) sequence, alignment of sight and course on the target is approached by turning the craft to the left and the sight somewhat more to the left and I make control position III rotate the sight relative to the craft, in the same direction as the signal pointer deflection.

It will be noted that the sequence a, b, or c, in existence will either continue or pass into one of the other sequences, and successive displacements of the control to positions corresponding to the sequence produces successive splitting of the misalignment.

Each time the bomber puts the control at neutral when the sight intersects or nearly intersects the target, the turning of the craft is halted on a straight course which the pilot is enabled to hold by the exact automatic deviation of index 281, Fig. 46, relative to the stabilized pointer 280 in accord with every deviation of the craft from a straight or zero index heading. This intermittent momentary stopping between turns on a straight course has the advantage that the bomber can with precision note target drift due to misalignment of the course, independent of "apparent drift", which would be introduced by turning of the craft and the sight with it during the observation. This pilot director and bomber control, described in the foregoing paragraphs, is the subject of a co-pending application, Serial No. 1,971, filed January 15, 1935.

Fig. 40 represents a plan view relative to a fixed target T of the craft's ground track $G_0$—$G_{15}$, changed by increments as the craft's fuselage axis $A_0$—$A_{15}$ and the bomber's plane of sighting $S_0$—$S_{15}$ are turned in connected degrees and directions through motive drive actuated by the bomber's displacements of the control to positions I, II or III.

Vector arrows A, W, G, represent in lengths and directions the relative speeds and directions of the craft relative to air, air relative to ground, and craft resultant relative to ground.

The circles represent the bomber's view through a telescopic field such as 20°, through reticule S constituting an optical vertical plane.

Starting the alignment when the craft reaches position 0 on a course $G_0$, the bomber has closed battery switch 163 (Fig. 47), thus running the pilot director gyro rotor and unlocking the pointer 280, also meshing worm 292 with pointer 281, worm wheel 291. The target T has just entered the optical field and appears considerably to the left of the random azimuth position of reticule $S_0$, and the bomber instinctively pushes the control hard left, actuating combination III which, according to the ratio and speed assumed in the above table, causes motive rotation of the pilot's pointer 281 to the left at the rate of 1.3° per second, while $S_0$ is rotated at 1° per second to the left relative to the craft body $A_0$ or 2.3° per second to the left relative to T. If the bomber centers the control after holding it three seconds during the craft's five second travel from position 0 to 5, then at 5, $S_5$ will have rotated from $S_0$ 6.9° ($=3 \times 2.3°$) and the pilot will have turned $A_0$ to $A_5$ through 3.9° ($=3 \times 1.3°$). The new vector resultant ground course $G_5$, extended past the target, is then closer than was $G_0$, but is still to the right and although the azimuth sequence is T, G, S ($a$, Fig. 41) for which control position III would be strictly correct, the bomber may not always distinguish cases $a$, $b$ and to illustrate that a mistake in choice of control positions is of no great consequence, let us assume that the bomber from 5 to 10, holds control at position II to the left for three seconds.

Control position II deflects the pilot's pointer 281 and the pilot turns $A_5$ to $A_{10}$ in accord, 5.4° ($=3 \times 1.8°$) to the left, while $S_5$ is rotated to $S_{10}$, 3° to the right relative to the craft, but 2.4° to the left relative to T. This mistake of control combination II instead of III has slightly overshot the ground course $G_{10}$, but $S_{10}$ is now so close to the target that the drifting of the image toward the reticule along course $G_{10}$ is readily apparent, indicating control position I, which is used only in this case $c$ sequence.

Control at position I for 3¾ seconds during craft travel from 10 to 15, effects right turn of $A_{10}$ to $A_{15}$ through 3° ($=3¾ \times .8°$) while $S_{10}$ is rotated to $S_{15}$ through ¾° to the left relative to T, and $S_{15}$ now intersects T. The new resultant ground course $G_{15}$, also intersects T, and alignment is thus accomplished in fifteen seconds elapsed time for the case illustrated.

Fig. 42 illustrates how the same process establishes alignment of the ground course $G_{15}$—$G_{35}$ on the unknown "lead" point $T_{35}$ ahead of a moving target by establishing a constant sight bearing angle $\psi$.

As the bomber at 0 observes target $T_0$ just entering the optical field, the random azimuth relations assumed are such that the component of the craft's speed on course $G_0$ parallel to the target's path $T_0$—$T_5$ is less than the target's speed, hence the target will recede further to the left and the bomber pushes the control to left position III. If, while the craft travels in five seconds from 0 to 5, and the target from $T_0$ to $T_5$, the bomber holds control III for two seconds, then $A_0$ is left turned 2.6° to $A_5$, while $S_0$ is turned 2° to the left relative to the craft, but 4.6° to the left relative to $S_0$. The new course $G_5$ is closer to correct alignment, but if $S_5$ were not rotated and $A_5$ and hence $G_5$ were not turned, say for five seconds, then $S_5$ would be carried along $G_5$ to $b$—$b$, from which $T_5$ would be further to the left than $T_0$ from $S_0$. This receding of the target image is actually apparent the instant $A_5$ and $S_5$ cease turning, when the bomber at 5 centers the control, hence the bomber makes the next control move during the craft's passage from 5 to 10. Either combination II or III would reduce the misalignment, position II effecting a turn of the course more than rotation of the sight and position III vice versa. If the bomber holds the control to the left at position II for one second, $A_5$ is turned to $A_{10}$, 1.8° left, and the sight to $S_{10}$, .8° to the left of $S_5$, when the bomber may observe that $S_{10}$ is not appreciably nearer $T_{10}$ than before and he applies control position III, which, held for two seconds, turns the craft 2.6° left, and the sight 4.6° into intersection with $T_{15}$. The final course $G_{15}$ is now correctly aligned, because any component as $f$—20 of craft travel 15—20, parallel to the target's motion, is equal to the target's travel $T_{15}$—$T_{20}$ in the same time interval, hence $S_{15-20-R}$ remains thereafter in intersection with the moving target, at a constant azimuth angle $\psi$ to the course. Without further directional control by the bomber, it only remains for him to determine point of bomb release R by synchronizing the cross reticule as previously described, ($t_1$—$t_r$, Fig. 17, by mirror rotation, Fig. 11) that is, to determine the range angle ($\alpha$ Fig. 14) in the directional sighting plane, $S_{15-20-R}$ (Fig. 42) according to the relative speed of approach which is the vector resultant of $G_{15}$ and the target's speed. If this relative range be R—$T_R$, the bomb released at R will travel the horizontal range R—$T_{35}$ in the same time that the target travels $T_R$—$T_{35}$.

The directional system has several advantages. The direct gyroscopic stabilization of pointer 280 without any transmission lag, in combination with motive deflected index reference 281, provides continuous instant, and exact indication of craft deviation in azimuth from the zero heading, and independent of bomber's manipulation and devoid of any fluctuation of indication due to manual holding. The positive interconnection between pointer 281 deflection and sight rotation, provides the bomber with instant movement of the sight corresponding to the pilot's turning of the craft, and provides the pilot with a turn signal exactly corresponding in a certain ratio to the turn of the sight observed by the bomber.

The separate control of motive rotation of the directional plane of sighting and of motive rotation of the range sight in that plane, each in directions corresponding to the apparent resulting movement of the sighting reticules, enables either synchronization or alignment to be adjusted in an instinctive manner without interfering with the adjustment of the other.

The range mechanism (Fig. 8) is mechanically positive and devoid of electrical working contacts, except for auxiliary automatic features not essential to the functioning of the range mechanism.

The field of view can be shifted in range, forward or back, without disturbing the adjusted synchronous rate.

The synchronous and presetting mechanism enables wind velocity to be determined with precision for use in navigation, and by presetting estimated wind the range angle may be preset and a rate of sight drive may be preset previous to synchronizing, approximately, to the advantage of quick synchronizing in a short approach.

The combination of automatic indication of the aligned heading and motive continuance of the synchronized drive of the line of sight permits determination of the bomb release instant and continued precision of alignment without continued visibility of the objective.

The range reticule arrangement enables alignment to be carried on over more than half the field of view without shifting the field.

The automatic caging of both the sight and the pilot director gyroscopes and cutting off the constant speed motor, in excessive craft oscillations, protects the gyroscopes from damage and saves unnecessary battery drain.

The automatic level detector gyro-uncaging device, insures improved precision in application of stabilization and reduction in the time necessary to continue straight flight approach.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a bomb sight, a computing means for computing a correction factor ($S_x$) comprising a cam settable in accordance with altitude, a second cam settable in accordance with the bomb characteristics, a parallel bar for each cam moved laterally thereby, a member settable longitudinally of said bar in accordance with a function of air speed, a diagonal lever having a sliding connection to the altitude bar and with said air speed member, a second diagonal lever having a sliding connection with said bomb characteristic bar, a bar slidable in a direction parallel to said parallel bars and having a slidable connection at one point with the altitude bar and first named lever and at another point with said second mentioned lever, and means for transmitting the correction movement in the direction of said parallel bars of the sliding point of intersection of said bomb characteristic bar and said second mentioned lever.

2. In a computing mechanism for bomb sights, a correction computer for computing $S_x$ comprising a cam settable in accordance with altitude, a second cam settable in accordance with the bomb characteristics, parallel bars for the respective cams moved laterally thereby, a member longitudinally settable in accordance with a function of air speed, a diagonal lever having a sliding connection to the altitude bar and with said air speed member, a second diagonal lever having a sliding connection with said bomb characteristic bar, a bar slidable in a direction parallel to said parallel bars and disposed transversely thereto and having a slidable connection at one point with the altitude bar and first named lever and at another point with said second mentioned lever, means for transmitting the correction movement in the direction of said parallel bars of the sliding point of intersection of said bomb characteristic bar and said second mentioned lever, means for obtaining ground speed ($S_g$), a member settable according to the difference of ground speed and the aforesaid transmitted movement, a second member movable at right angles to the first member and settable in accordance with a function of altitude $$\frac{T_v}{H}$$

and a bar pivoted between said two members, the angle of which gives the range angle.

3. In a bomb sight for setting range angle, a line of sight device, means for synchronously training the line of sight upon the target, range angle computing means including air speed setting means and means interconnecting said synchronous means and said air speed setting means for causing said line of sight device to be actuated in accordance with the air speed setting, and regulating means for modifying the movement of the line of sight device as a result of said air speed setting in accordance with the speed of approach towards the target and simultaneously effect a corresponding change in the setting of the range angle computing means.

4. In a bomb sight for setting range angle, a line of sight device, means for synchronously training the line of sight upon the target, range angle computing means including air speed setting means and means interconnecting said synchronous means and said air speed setting means for causing said line of sight device to be actuated in accordance with the air speed setting, regulating means for modifying the movement of the line of sight device as a result of said air speed setting in accordance with the speed of approach towards the target and simultaneously effect a corresponding change in the setting of the range angle, and a dial operatively connected to said regulating means for indicating the component of wind velocity of the craft target course.

5. In a sighting device, a casing, a closure device for said casing, optical elements supported within said casing including a prism carried by said closure device and a reticule, means to prevent the removal of said reticule, said prism lying in the path of movement of said reticule when being removed, gyroscopic means for supporting and stabilizing said reticule above said prism, and means operated by the opening of said closure device for rendering ineffective said means to prevent removal and for caging said reticule in a predetermined position.

6. In a computing mechanism, a sighting device including a removable reticule and a removable prism, means to prevent the insertion of said reticule when said prism is in normal position, said prism lying normally in the path of movement of said reticule when being inserted, and means operated by removal of said prism from the path of movement of said reticule for rendering ineffective said means to prevent insertion.

7. In a computing mechanism, a sighting device including a removable reticule and a removable prism, means to prevent the removal of said reticule, said prism lying in the path of movement of said reticule when being removed, and means operated by removal of said prism from the path of movement of said reticule for rendering ineffective said means to prevent removal.

8. In a computing mechanism, a sighting device including a removable reticule and a removable prism, means to prevent the removal of said reticule, said prism lying in the path of movement of said reticule when being removed, means operated by removal of said prism from the path of movement of said reticule for rendering ineffective said means to prevent removal, and means operated in removing said prism from the path of movement of said reticule for rendering ineffective said means to prevent removal, and for caging said reticule in a predetermined position.

9. In a computing mechanism, a sighting device including a removable reticule and a prism, means to prevent the removal of said reticule, said prism lying in the path of movement of said reticule when being removed, and means operated by removal of said prism from the path of movement of said reticule for rendering ineffective said means to prevent removal.

10. In a bomb system for setting range angle, a line of sight device, means for synchronizing the motion of the line of sight with the apparent motion of the target including altitude setting means, air speed setting means, a regulating means to correct for wind velocity component, a means for determining the range angle operatively connected to be adjusted by each of said setting means, computing means also operatively connected to be adjusted by each of said setting means and means whereby said computing means adjust said determining means for obtaining a correction for bomb characteristics.

11. In a bomb system for setting range angle, a line of sight device, means for synchronizing the motion of the line of sight with the apparent motion of the target including altitude setting means, air speed setting means, a regulating means to correct for wind velocity component, a means for determining the range angle operatively connected to be adjusted by each of said setting means, and a correcting computing means operatively connected to adjust said range determining means and to be adjusted by each of said setting means in such a manner as to respond concurrently with the adjustment of said range determining means for superimposing thereupon a corresponding correction for air resistance.

12. In a bomb sight for setting range angle, a line of sight device, means for synchronizing the motion of the line of sight with the apparent motion of the target including an altitude setting means and an approach speed setting means including an air speed setting means and a regulator for modifying the air setting in accordance with the approach towards the target and a means for determining the range angle including a member operatively adjusted by each of said setting means and a correcting computing means operatively connected to adjust said range determining means and to be adjusted by each of said setting means in such a manner as to respond concurrently with the adjustment of said range determining means for superimposing thereupon corresponding adjustments for air resistance.

13. In a bomb sight for aircraft, a target reflecting means, means for mounting the same for rotation in azimuth and for fore-and-aft tilting to follow the target, variable speed means for actuating said target reflecting means and selective means associated with said variable speed means for changing the direction of rotation of said reflecting means at will without changing the rate of rotation thereof.

14. In a bomb sight for aircraft, a target reflecting means, means for mounting the same for rotation in azimuth and for fore-and-aft tilting to follow the target, constant speed means for actuating said target reflecting means, differential means operatively connected with said constant speed means for varying the rate of rotation of said reflecting means and selective means associated with said constant speed means for changing the direction of rotation of said reflecting means at will without changing the rate of rotation of said reflecting means.

15. In a bomb sight, a computing means for computing a correction factor ($S_x$) comprising a cam settable in accordance with altitude, a second cam settable in accordance with the bomb characteristics, a parallel bar for each cam moved laterally thereby, a member settable longitudinally of said bar in accordance with a function of air speed, a diagonal lever having a sliding connection of the altitude bar and with said air speed member, a second diagonal lever having a sliding connection with said bomb characteristic bar, a bar slidable in a direction parallel to said parallel bar and having a slidable connection at one point with the altitude bar and first named lever and at another point with said second mentioned lever, means for transmitting the correction movement in the direction of said parallel bars of the sliding point of intersection of said bomb characteristic bar and said second mentioned lever, and manual means for changing the speed and/or direction of rotation of said drive without affecting any of said settings.

16. In a bomb sight, a movable sighting member, means for tilting the same at a speed to maintain the line of sight on a target, including a variable speed drive, range angle determining means, an altitude setting device, an air speed setting device, and a wind velocity compensating device, and connections from said three devices to said variable speed drive and to said range angle determining means for controlling the movement of said member to maintain the sight line on the target and simultaneously adjusting said range angle means to correctly determine the range angle.

17. In a bomb sight, a movable sighting member, means for tilting the same at a speed directly proportional to ground speed and inversely proportional to altitude, said means including a variable speed drive, an air speed setting device and a regulating device for compensating for wind velocity, each of said devices being connected to said variable speed drive to adjust the same in accordance with ground speed, an altitude setting device and a second variable drive between said first named variable speed drive and said sight controlled by said altitude setting device.

18. In a bomb sight for determining range angles, a line of sight device, means for synchronizing the motion of the line of sight of said device with the apparent motion of the target, a variable speed means operatively connected to drive said synchronizing means, means for computing the range angle including an altitude setting means and a member adapted to be adjusted by said altitude setting means, said variable setting means being adjusted in part by said altitude setting means, a second computing means having an element adjustable in part by said altitude setting means in accordance with "summital" speed, means actuated by said part for adjusting said member, whereby the member is adjusted in accordance with a combined function of altitude and summital speed for said altitude.

19. In a bomb sight, means for setting the range angle including a movable member, means for adjusting said member according to known air speed, altitude and wind velocity component, computing means connected to be affected by each of said adjustments to compute the "summital" speed and means connecting said computing means and member for modifying the adjustment of the latter in accordance with the difference between ground speed and said "summital" speed.

20. In a bomb sight, means for setting the range angle including a movable member, means for adjusting said member according to known air speed, altitude and wind velocity component, and "summital" speed computing means connected to be affected by each of said adjustments and means connecting said summital speed computing means and member for modifying the adjustment of the same for obtaining the range angle according to the equation $$\alpha = \frac{S_s T_v}{H}$$

wherein $S_s$ is summital speed, $T_v$ is time of fall in vacuum and $H$ is altitude.

21. In a bomb sight, means for setting the range angle including a movable member, means for adjusting said member according to known air speed and altitude, means for regulating said member to correct for wind velocity component, a bomb characteristic adjusting means, computing means connected to be affected by each of said adjustments to compute "summital" speed and mechanical means connecting said computing means and member for modifying the adjustment of the latter in accordance with "summital" speed.

22. In a bomb sight for setting range angle, a line of sight device, variable means for synchronously training said line of sight upon the target, range angle determining means, altitude setting means connected to adjust said determining means and means operatively connecting said variable speed means and said altitude setting means for causing a change in the speed of the line of sight device corresponding to any change set into said range angle determining means by said altitude setting means.

23. In a bomb sight for aircraft, the combination with an optical system, variable speed means for rotating the same in azimuth, manually adjustable means for adjusting said first-named means to maintain the line of sight on the target, and means also operated by said manual means for producing a signal for turning the craft until coincidental intersection of the ground course and the line of sight with the target is obtained.

24. In a bomb sight for aircraft, the combination with an optical system rotatable in azimuth, a common means for rotating said system to maintain the sight on the target and for simultaneously producing a signal for turning the craft at a pre-determined rate, which is greater than the rate of turning of the craft, until coincidental intersection of the ground course and line of sight with the target is obtained, and means for determining when such coincidental relationship is reached.

25. The method of approaching a target with bombing aircraft having a bomb sight rotatable in azimuth which comprises, setting up a variable rate of turn of the sight sufficient to keep the sight on the target and causing, by such act, signaling for turning of the craft at a predetermined rate which is greater than the rate of turning of the craft.

26. The method of approaching a target with bombing aircraft having a bomb sight rotatable in azimuth which comprises setting up a variable rate of turn of the sight sufficient to keep the sight on the target, causing, by such act, signaling for turning of the craft at a predetermined substantially constant rate which is greater than the rate of turning of the craft turning the aircraft at such a rate and discontinuing the turn when the rate of turn of the sight reaches zero in space.

27. In a bomb sight for aircraft, the combination with an optical system, variable speed means for rotating the same in azimuth, manually adjustable means for adjusting said first-named means to maintain the line of sight on the target, means also operated by said manual means to produce a signal for turning of the craft until coincidental intersection of the ground course and the rate of sight with the target is obtained, and means for enabling the steering of said craft to fly on a straight ground track toward the target when absolute rotation of the sight ceases.

28. In a bomb sight for aircraft, the combination with an optical system, variable speed means for rotating the same in azimuth, manually adjustable means for adjusting said first-named means to maintain the line of sight on the target, means also operated by said manual means to produce a signal for turning of the craft until coincidental intersection of the ground course and the rate of sight with the target is obtained, and means for determining the point at which the straight ground track is reached.

29. The method of approaching a target with bombing aircraft having a bomb sight rotatable in azimuth which comprises, setting up a variable rate of turn of the sight sufficient to keep the sight on the target, causing, by such act, signaling for turning of the craft at a predetermined rate which is greater than the rate of turning of the craft, turning the craft at such rate determining the point at which the turning of the craft and sight become equal and opposite, discontinuing both turning operations at that point, and proceeding on the straight ground track to the target.

30. In a bomb sight for aircraft, the combination with an optical system rotatable in azimuth, and a common means for rotating said system to maintain the sight on the target and for simultaneously producing a signal for turning of the craft at a pre-determined rate which is greater than the rate of turning of the craft until coincidental intersection of the ground course and the line of sight with the target is obtained.

31. The method of approaching the target with bombing aircraft having a bomb sight rotatable in azimuth which comprises, setting up a variable rate of turn of the sight sufficient to keep the sight on the target and causing, by such act, an indication for turning of the craft at a predetermined rate which is greater than the rate of turning of the craft.

32. The method of approaching a target with bombing aircraft having a bomb sight rotatable in azimuth which comprises, setting up a variable rate of turn of the sight sufficient to keep the sight on the target, causing, by such act, an indication to be produced for turning of the craft at a predetermined rate which is greater than the rate of turning of the craft, turning of the craft at such rate and discontinuing the turn when the rate of turn of the sight reaches zero in space.

HENRY B. INGLIS.